US012612174B2

(12) United States Patent

Mitani

(10) Patent No.: US 12,612,174 B2

(45) Date of Patent: Apr. 28, 2026

(54) POWER SUPPLY SYSTEM, MOVING OBJECT, AND CONTROL METHOD OF POWER SUPPLY SYSTEM

(71) Applicant: HONDA MOTOR CO., LTD., Tokyo (JP)

(72) Inventor: Manabu Mitani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/091,000

(22) Filed: Mar. 26, 2025

(65) Prior Publication Data

US 2025/0304274 A1     Oct. 2, 2025

(30) Foreign Application Priority Data

Mar. 29, 2024    (JP) ................................. 2024-057092

(51) Int. Cl.
| | |
|---|---|
| *B64D 31/18* | (2024.01) |
| *B64D 27/33* | (2024.01) |
| *H02J 1/06* | (2026.01) |
| *H02J 1/10* | (2026.01) |

(52) U.S. Cl.
CPC ............. *B64D 31/18* (2024.01); *B64D 27/33* (2024.01); *H02J 1/06* (2013.01); *H02J 1/106* (2020.01); *B60Y 2200/52* (2013.01)

(58) Field of Classification Search
CPC ........ B64D 31/18; B64D 27/33; B64D 27/02; B64D 27/24; H02J 1/106; H02J 1/06; B60Y 2200/52
See application file for complete search history.

(56) References Cited

U.S. PATENT DOCUMENTS

| | | | | |
|---|---|---|---|---|
| 12,374,895 | B2 * | 7/2025 | Mitani | ...................... H02J 3/38 |
| 12,397,727 | B2 * | 8/2025 | Mitani | ...................... H02J 3/38 |
| 2010/0284117 | A1 | 11/2010 | Crane | |
| 2022/0204173 | A1 | 6/2022 | Barraco et al. | |
| 2022/0306020 | A1 * | 9/2022 | Matsumoto | ........... B60R 16/033 |
| 2023/0318303 | A1 | 10/2023 | Mitani et al. | |
| 2024/0332961 | A1 * | 10/2024 | Mitani | .................... H02J 1/106 |
| 2024/0332978 | A1 * | 10/2024 | Mitani | .................. B60L 3/0092 |
| 2025/0293514 | A1 * | 9/2025 | Haga | ....................... H02J 1/084 |

FOREIGN PATENT DOCUMENTS

JP       2022-529997 A     6/2022

OTHER PUBLICATIONS

Extended European Search Report dated Jul. 29, 2025 issued in corresponding European application No. 25167173.1; 8 pages.

* cited by examiner

*Primary Examiner* — Rodney A Bonnette

(74) *Attorney, Agent, or Firm* — Rankin, Hill & Clark LLP

(57) ABSTRACT

A power supply system includes: a first power supply circuit for supplying, to a first load device, direct current electric power output from a first power generation device; and a second power supply circuit for supplying, to a second load device, direct current electric power output from a second power generation device. In a case where the electric power output from the second power generation device is supplied to the first load device, a control device connects the first power supply circuit and the second power supply circuit to each other after suppressing the power consumption of the first load device and increasing the power consumption of the second load device.

6 Claims, 17 Drawing Sheets

VOLTAGE

—— FIRST POWER SUPPLY SUBSYSTEM
---- SECOND POWER SUPPLY SUBSYSTEM

P

Q

TIME

REQUIRED
ELECTRIC POWER

—— FIRST LOAD
    DEVICE
---- SECOND LOAD
    DEVICE
——— THIRD LOAD
    DEVICE
—··— FOURTH LOAD
    DEVICE

TIME

CURRENT

OVERCURRENT

TIME t1                    t2

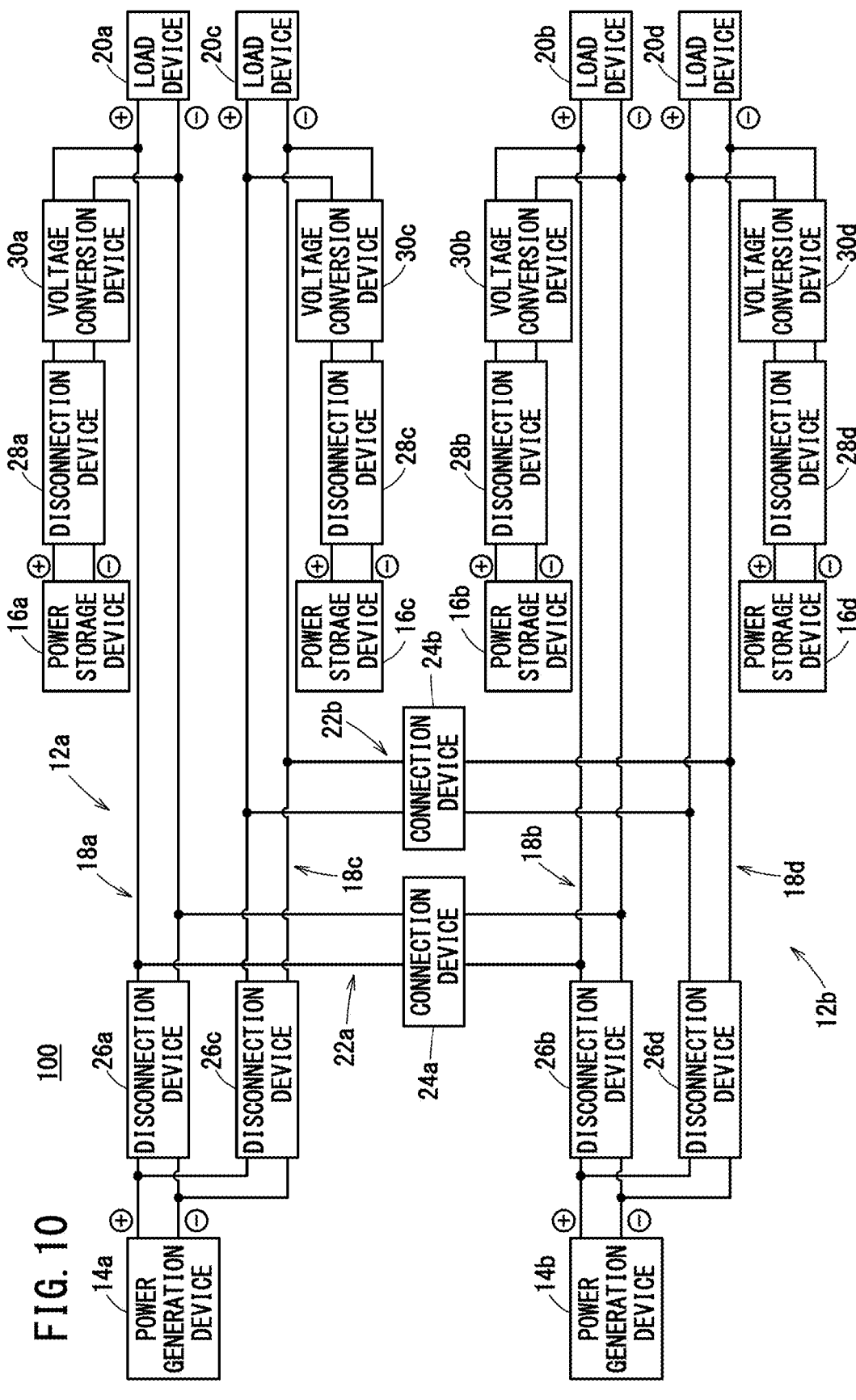

VOLTAGE

—— FIRST POWER SUPPLY SUBSYSTEM
---- SECOND POWER SUPPLY SUBSYSTEM

TIME

REQUIRED
ELECTRIC POWER

——FIRST LOAD
DEVICE
----SECOND LOAD
DEVICE
—·—THIRD LOAD
DEVICE
—··—FOURTH LOAD
DEVICE

TIME

CURRENT

TIME t21     t22          t23

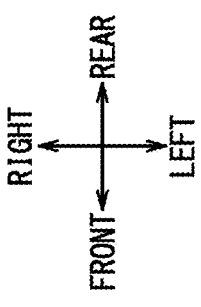
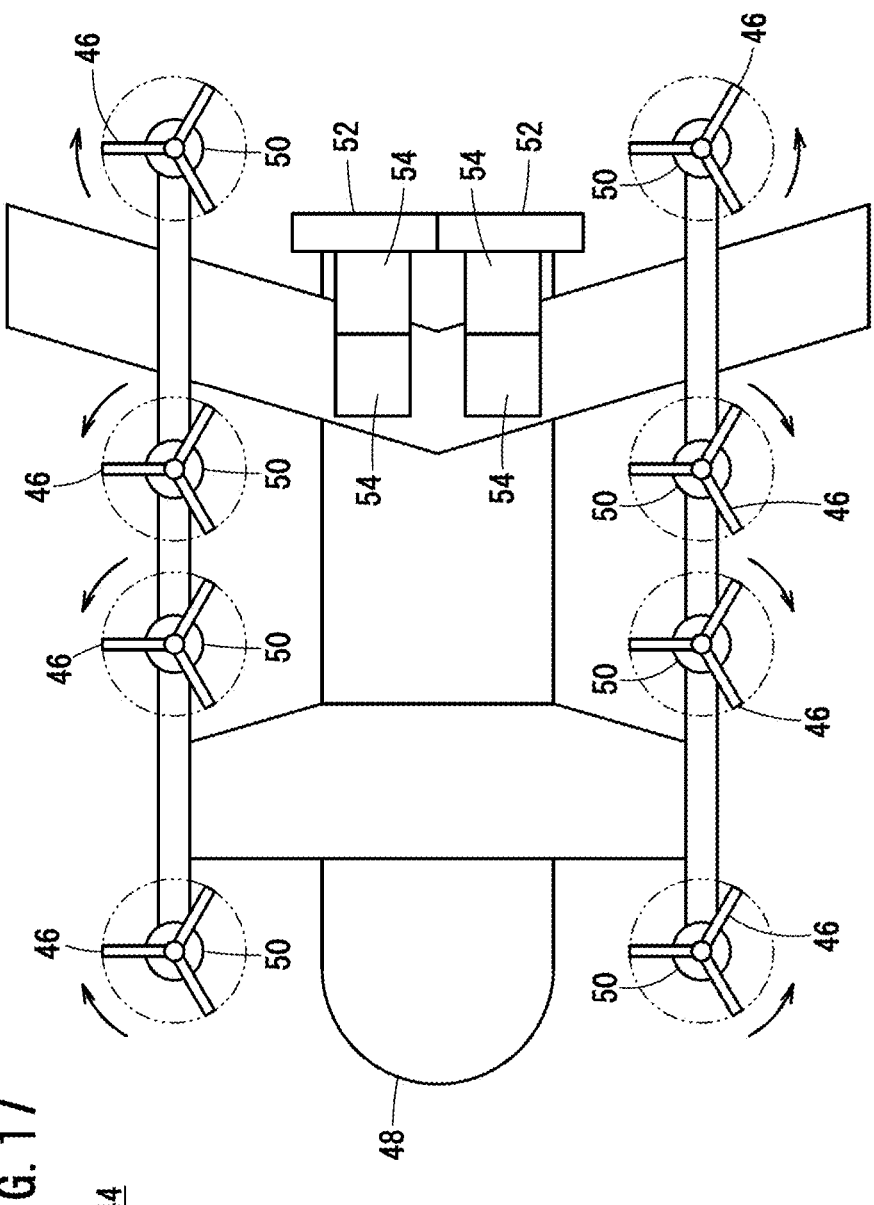
FIG. 17

POWER SUPPLY SYSTEM, MOVING OBJECT, AND CONTROL METHOD OF POWER SUPPLY SYSTEM

CROSS-REFERENCE TO RELATED APPLICATIONS

This application is based upon and claims the benefit of priority from Japanese Patent Application No. 2024-057092 filed on Mar. 29, 2024, the contents of which are incorporated herein by reference.

BACKGROUND OF THE INVENTION

Field of the Invention

The present disclosure relates to a power supply system, a moving object, and a control method of the power supply system.

Description of the Related Art

JP 2022-529997 A discloses an aircraft electrical energy supply network (power supply system).

SUMMARY OF THE INVENTION

There has been a demand for a more satisfactory power supply system, a more satisfactory moving object including the power supply system, and a more satisfactory control method of the power supply system.

The present invention has the object of solving the aforementioned problem.

According to a first aspect of the present disclosure, there is provided a power supply system comprising: a first power supply circuit configured to supply, to a first load device, electric power output from a first power generation device, the electric power being direct current electric power; a first power storage device connected to the first power supply circuit in parallel with the first power generation device; a second power supply circuit configured to supply, to a second load device, electric power output from a second power generation device, the electric power being direct current electric power; a second power storage device connected to the second power supply circuit in parallel with the second power generation device; a first connection circuit including a first connection device configured to connect the first power supply circuit and the second power supply circuit to each other; and a control device configured to execute, on the first connection device, first connection control for connecting the first power supply circuit and the second power supply circuit to each other via the first connection circuit, wherein, in a case where the electric power output from the second power generation device is required to be supplied to the first load device and a difference between a voltage of the first power supply circuit and a voltage of the second power supply circuit is equal to or greater than a first voltage threshold determined in advance, the control device executes the first connection control on the first connection device after executing first power consumption suppression control on the first load device and executing first power consumption increase control on the second load device, the first power consumption suppression control being control for suppressing power consumption of the first load device to suppress a decrease in an output voltage of the first power storage device, the first power consumption increase control being control for increasing power consumption of the second load device to promote a decrease in an output voltage of the second power storage device.

According to a second aspect of the present disclosure, there is provided a moving object comprising the power supply system according to the first aspect.

According to a third aspect of the present disclosure, there is provided a control method of a power supply system, the power supply system including: a first power supply circuit configured to supply, to a first load device, electric power output from a first power generation device, the electric power being direct current electric power; a first power storage device connected to the first power supply circuit in parallel with the first power generation device; a second power supply circuit configured to supply, to a second load device, electric power output from a second power generation device, the electric power being direct current electric power; a second power storage device connected to the second power supply circuit in parallel with the second power generation device; and a first connection circuit including a first connection device configured to connect the first power supply circuit and the second power supply circuit to each other, the control method comprising, in a case where the electric power output from the second power generation device is required to be supplied to the first load device and a difference between a voltage of the first power supply circuit and a voltage of the second power supply circuit is equal to or greater than a first voltage threshold determined in advance, executing, on the first connection device, first connection control for connecting the first power supply circuit and the second power supply circuit to each other via the first connection circuit, after executing first power consumption suppression control on the first load device and executing first power consumption increase control on the second load device, the first power consumption suppression control being control for suppressing power consumption of the first load device to suppress a decrease in an output voltage of the first power storage device, the first power consumption increase control being control for increasing power consumption of the second load device to promote a decrease in an output voltage of the second power storage device.

According to the present invention, it is possible to provide a more satisfactory power supply system, a more satisfactory moving object including the power supply system, and a more satisfactory control method of the power supply system.

The above and other objects, features, and advantages of the present invention will become more apparent from the following description when taken in conjunction with the accompanying drawings, in which a preferred embodiment of the present invention is shown by way of illustrative example.

3                                                                 4

Figure 5:
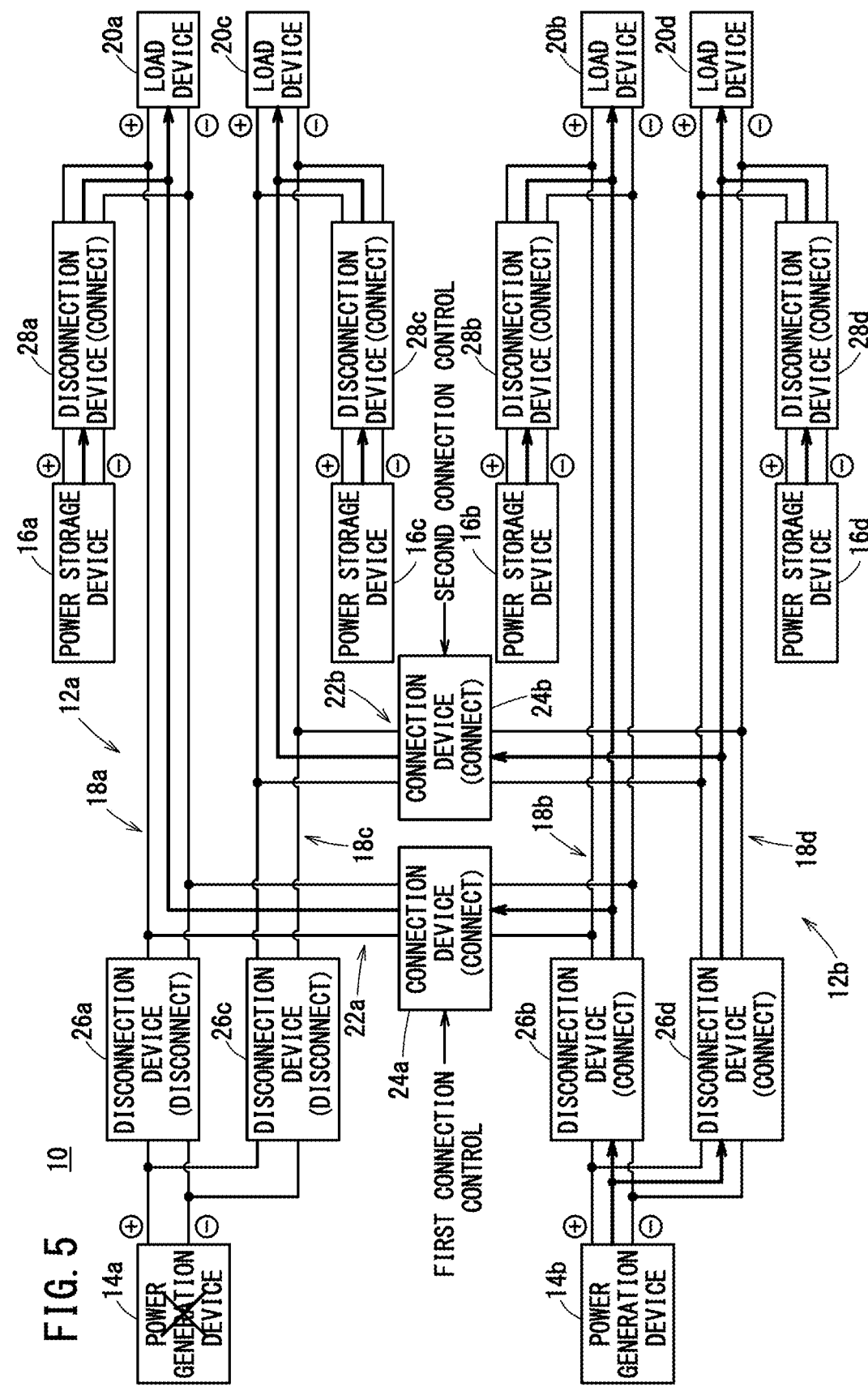
Figure 6:
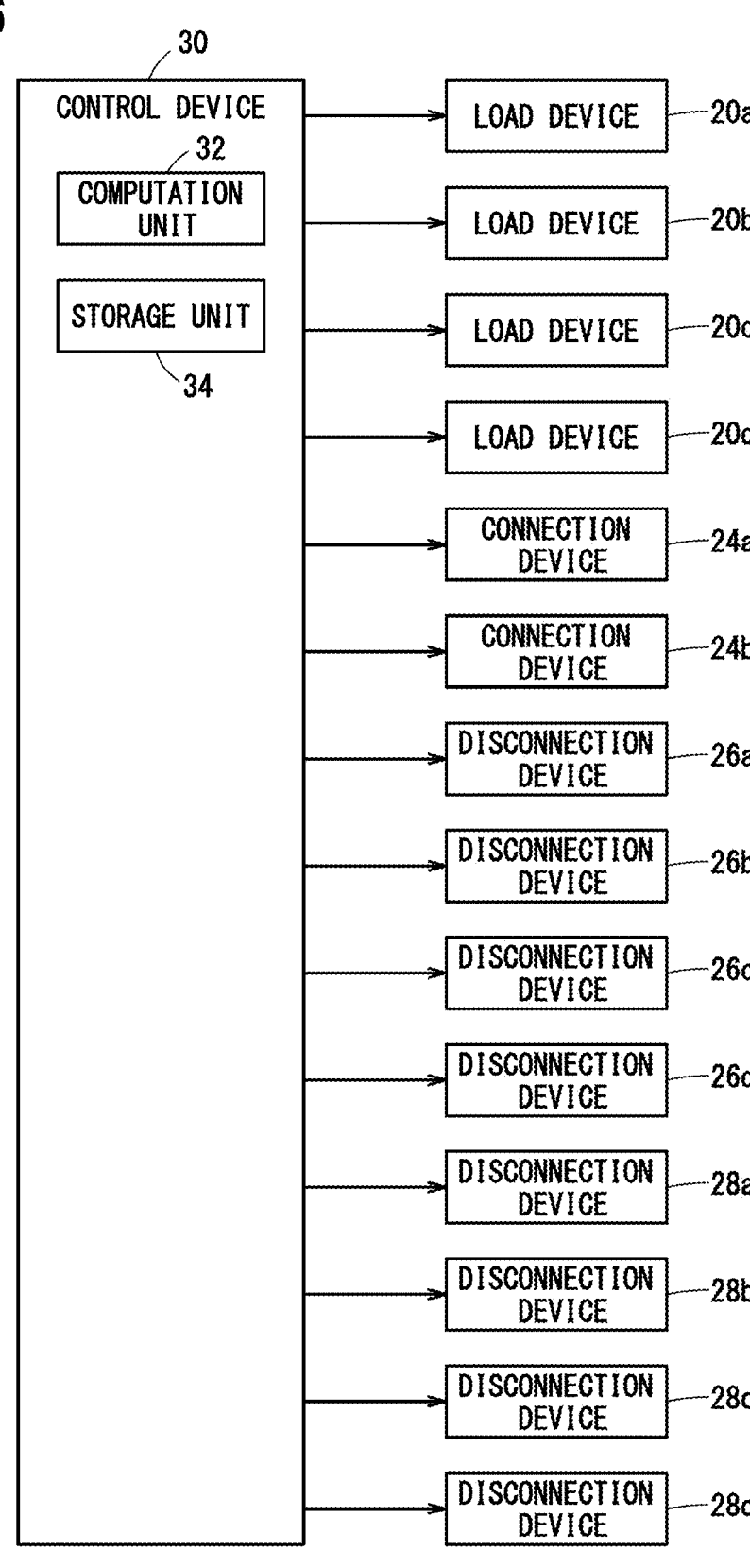
Figure 7:
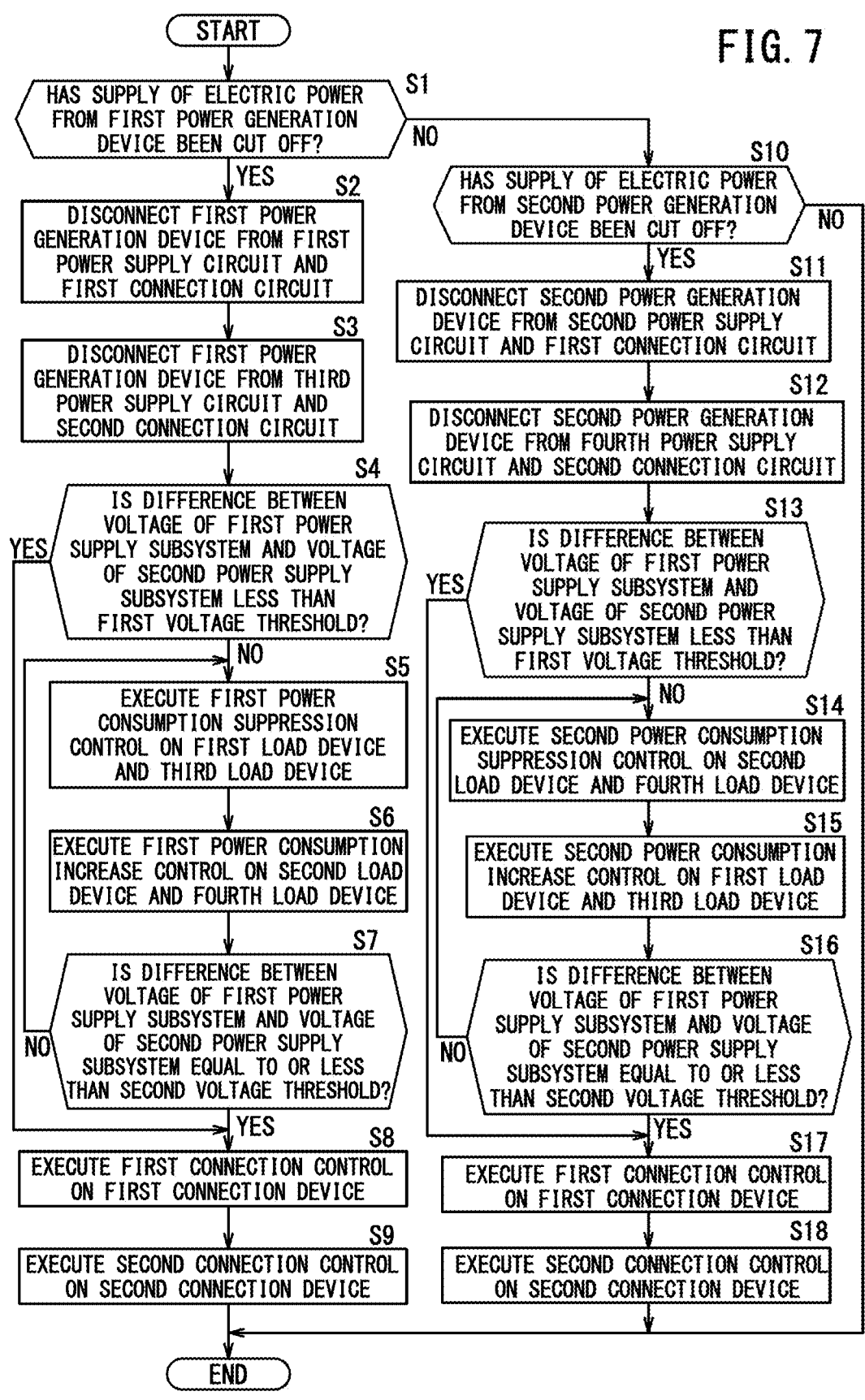
Figures 8A, 8B, 8C:
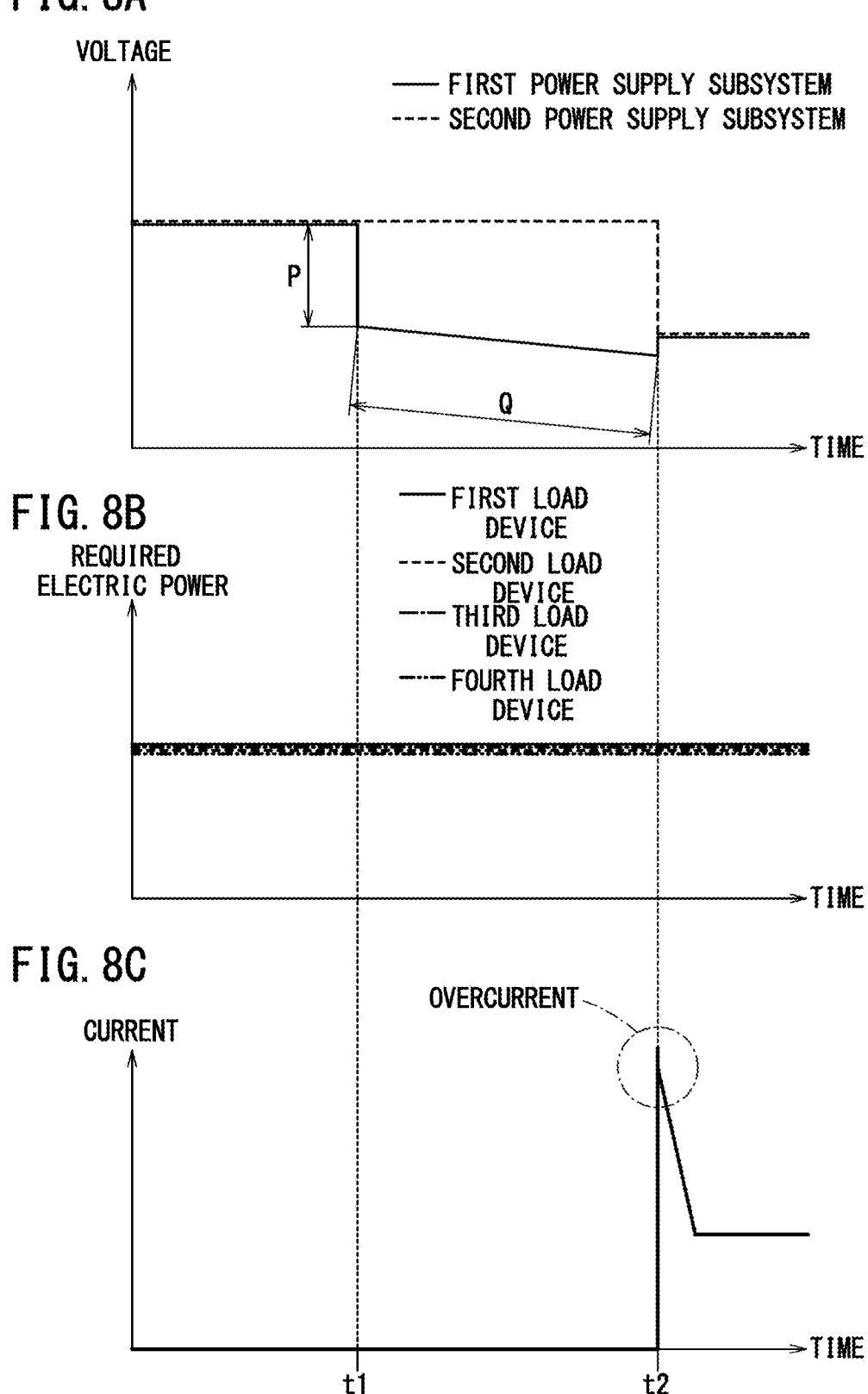
Figures 9A, 9B, 9C:
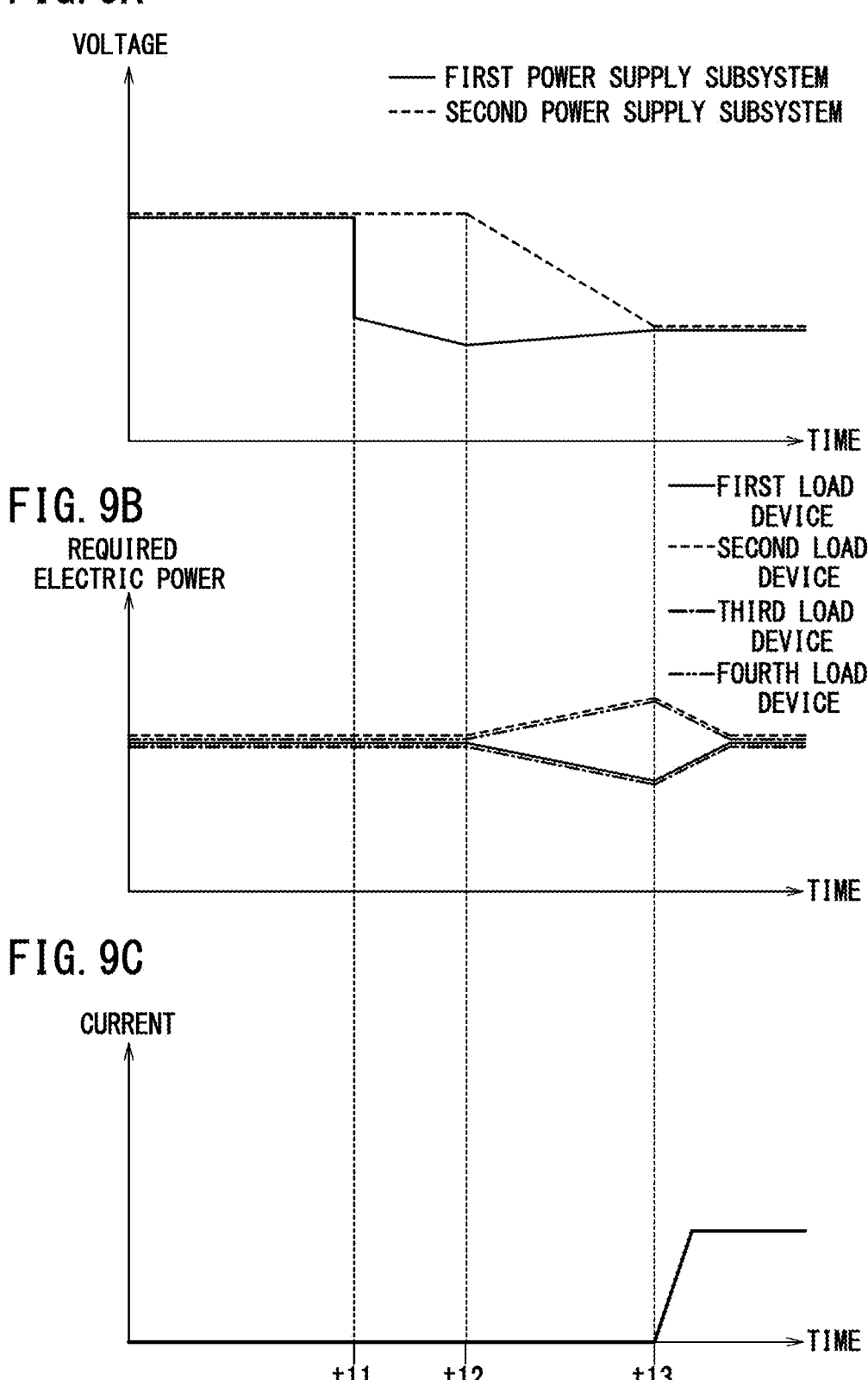
Figure 11:
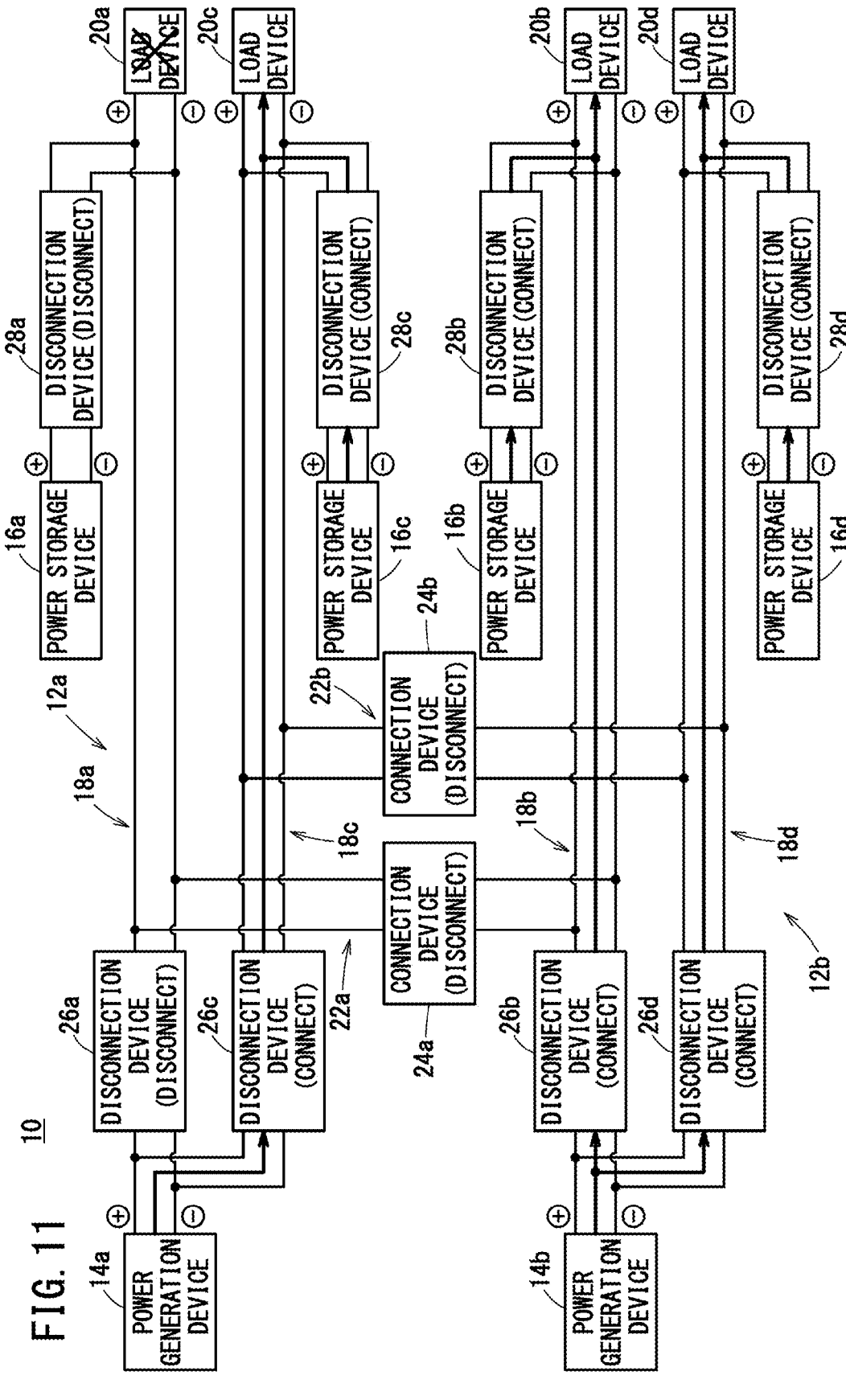
Figure 12:
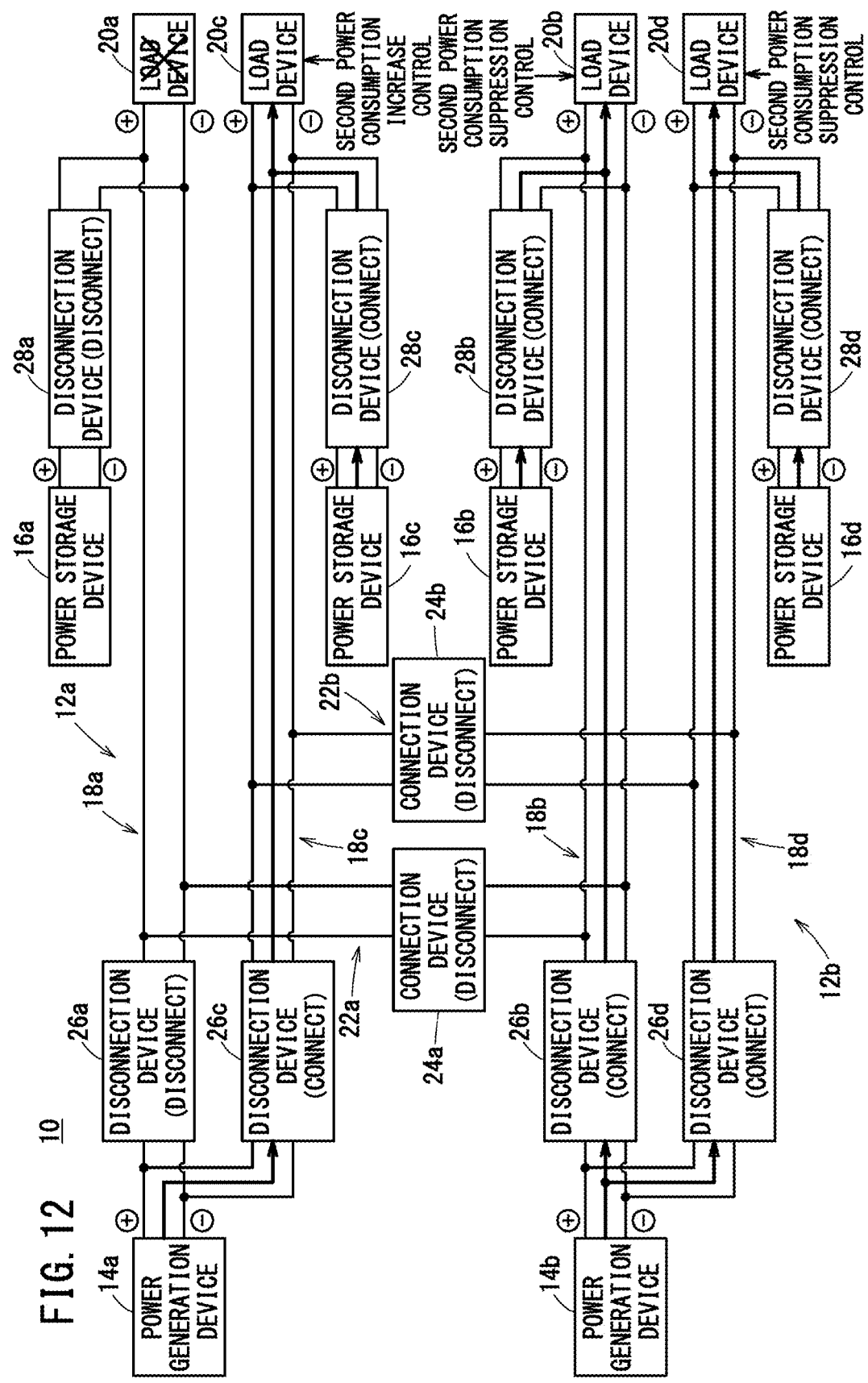
Figure 13:
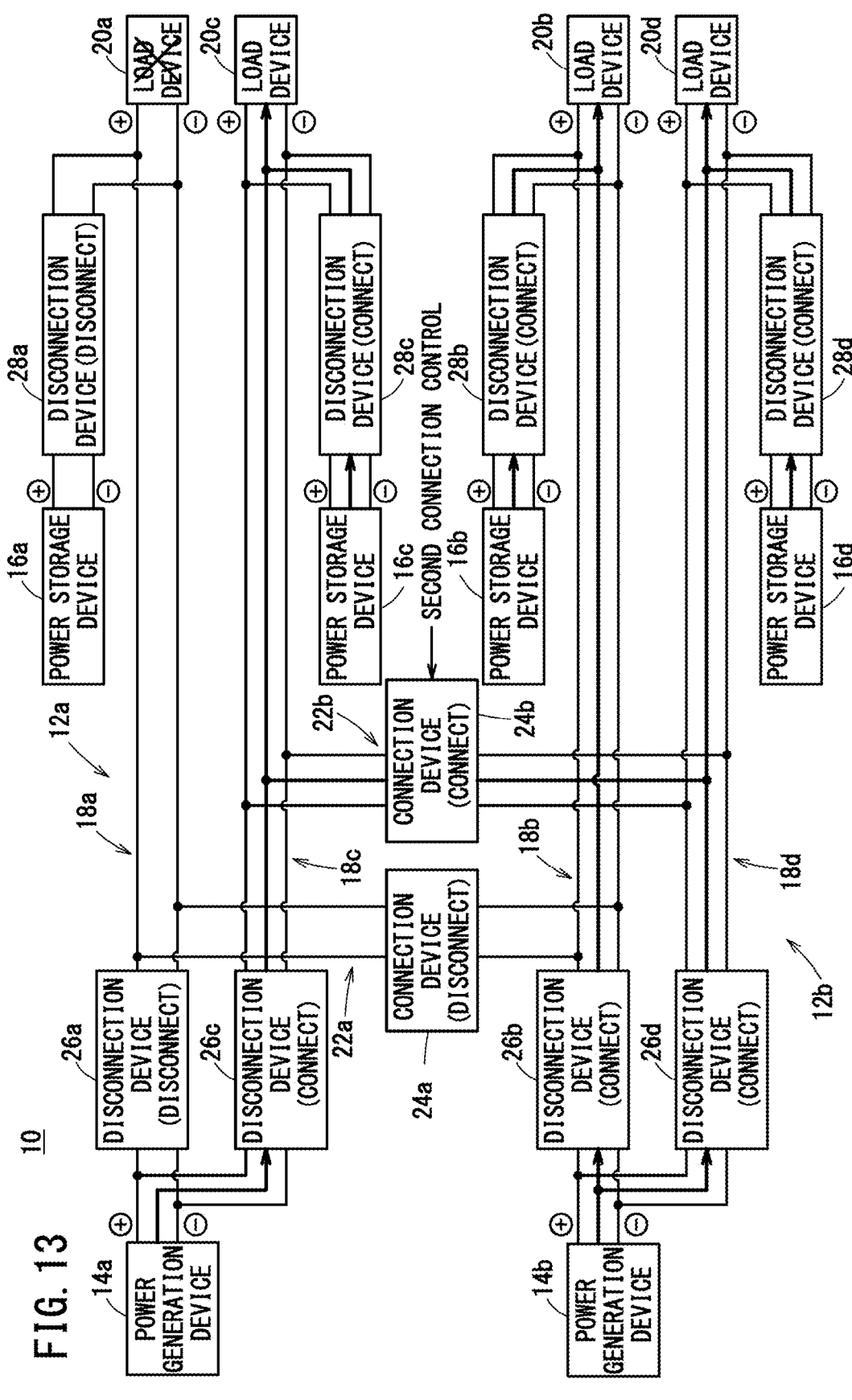
Figure 14:
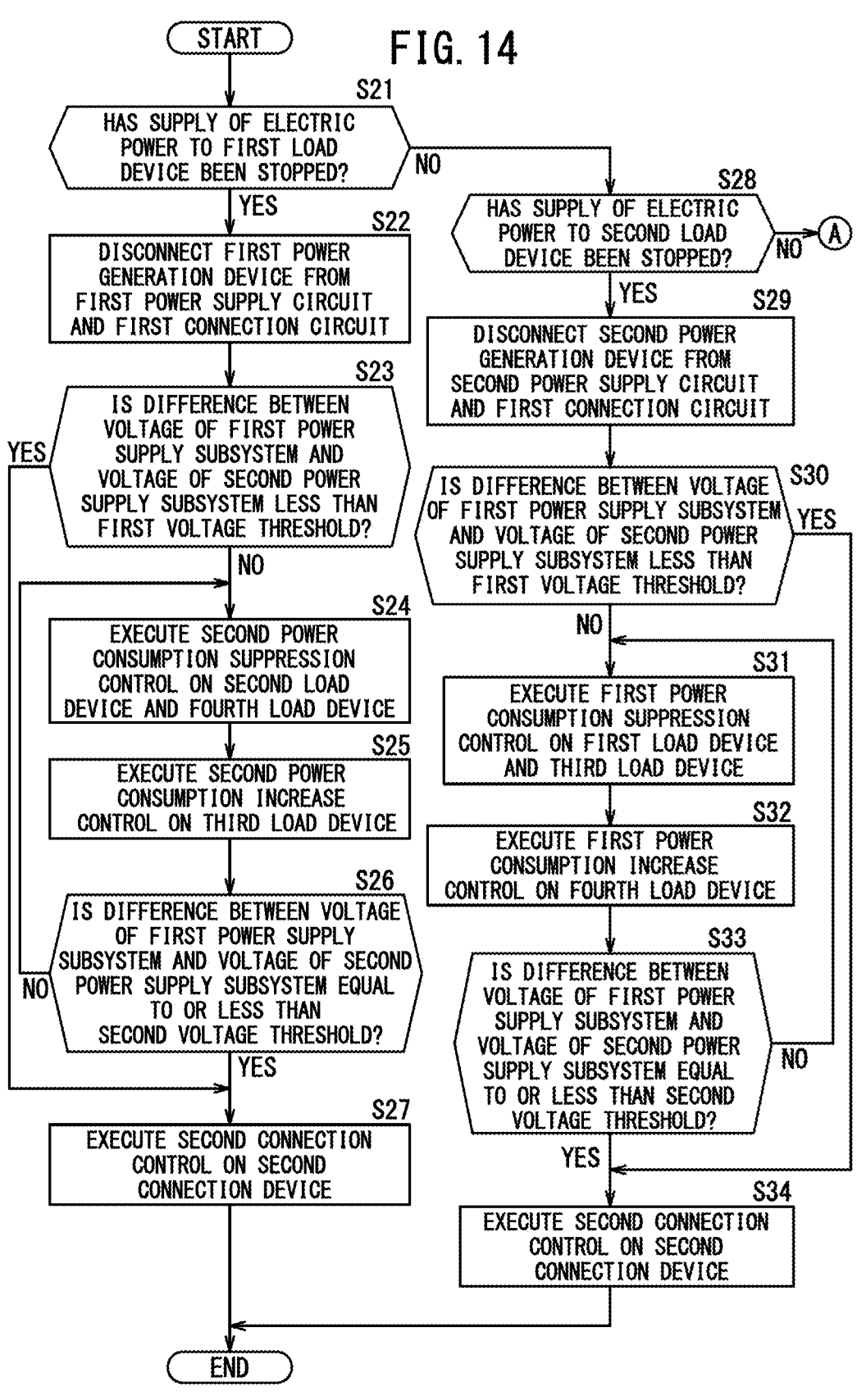
Figure 15:
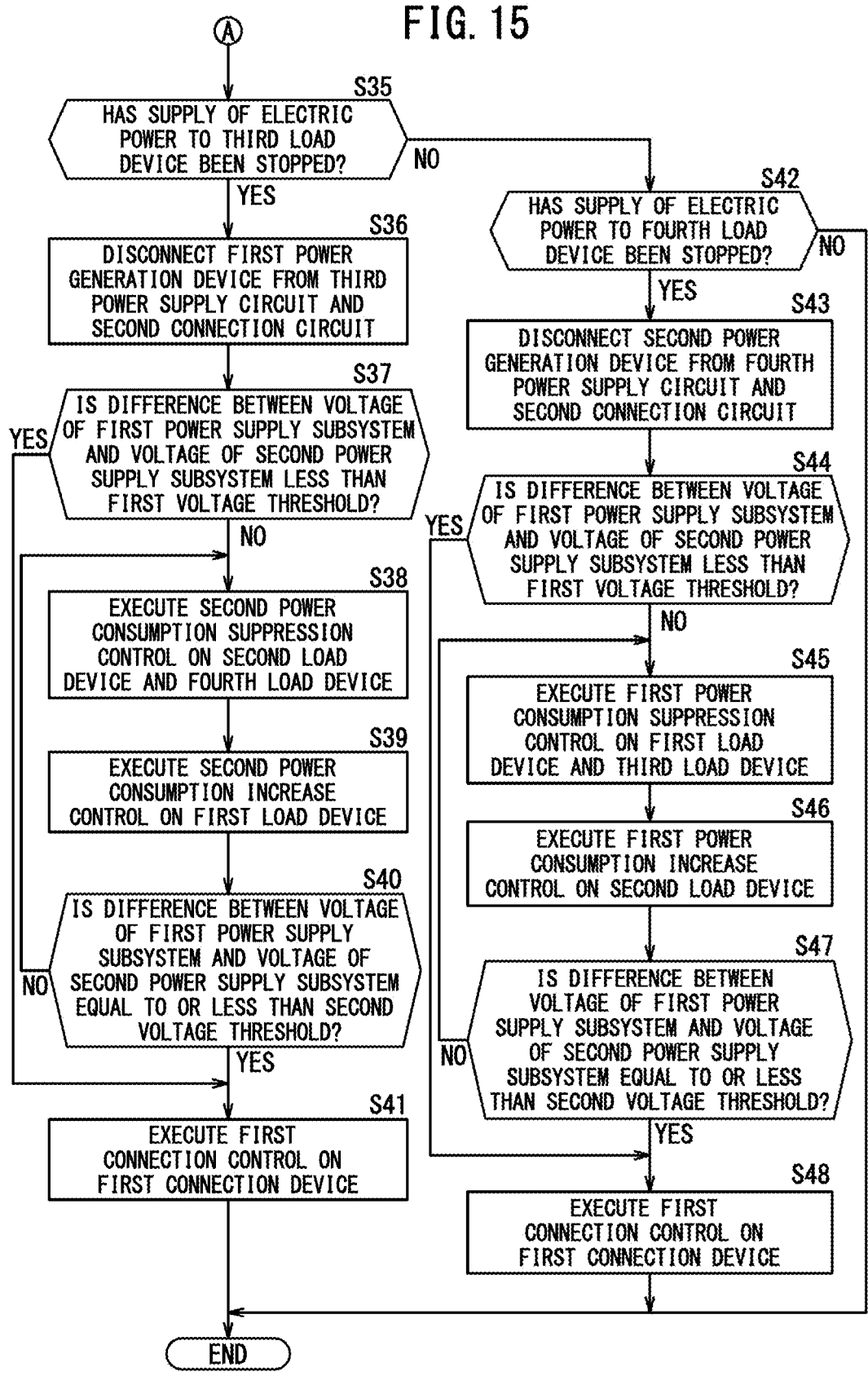
Figures 16A, 16B, 16C:
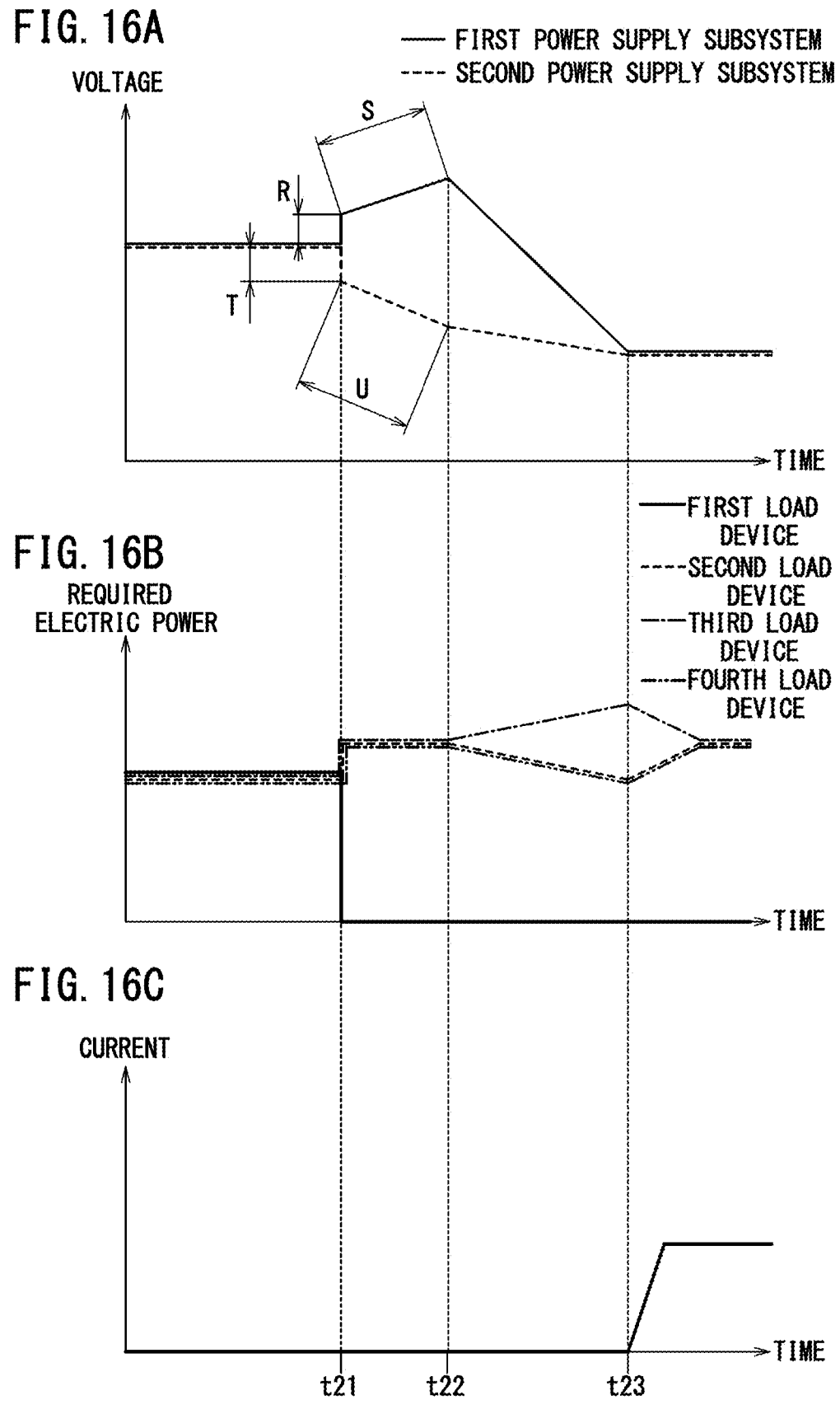

FIG. 5 is a diagram showing the operation of the power supply system of the first embodiment in the event of an abnormality;

FIG. 6 is a control block diagram of a control device in the first embodiment;

FIG. 7 is a flowchart showing fail-safe control of the first embodiment;

FIG. 8A, FIG. 8B, and FIG. 8C are graphs each showing a temporal change in the state of the power supply system in time periods before and after a time point at which a first power supply subsystem and a second power supply subsystem are connected;

FIG. 9A, FIG. 9B, and FIG. 9C are graphs each showing a temporal change in the state of the power supply system in the time periods before and after the time point at which the first power supply subsystem and the second power supply subsystem are connected;

FIG. 10 is a schematic diagram of a power supply system according to a comparative example;

FIG. 11 is a diagram showing the operation of the power supply system of a second embodiment in the event of an abnormality;

FIG. 12 is a diagram showing the operation of the power supply system of the second embodiment in the event of an abnormality;

FIG. 13 is a diagram showing the operation of the power supply system of the second embodiment in the event of an abnormality;

FIG. 14 is a flowchart showing the fail-safe control;

FIG. 15 is a flowchart showing the fail-safe control;

FIG. 16A, FIG. 16B, and FIG. 16C are graphs each showing a temporal change in the state of the power supply system in the time periods before and after the time point at which the first power supply subsystem and the second power supply subsystem are connected; and FIG. 17 is a schematic diagram of a moving object.

DETAILED DESCRIPTION OF THE INVENTION

Conventionally, as a power supply system mounted on an electric vertical take-off and landing aircraft (eVTOL aircraft), a power supply system including two power supply subsystems, namely, a first power supply subsystem and a second power supply subsystem, has been proposed.

The first power supply subsystem is a system that supplies electric power to a first load device, and includes a first power generation device that is a main power source, a first power storage device that is an auxiliary power source, and a first power supply circuit that supplies electric power from the first power generation device to the first load device. The second power supply subsystem is a system that supplies electric power to a second load device, and includes a second power generation device that is a main power source, a second power storage device that is an auxiliary power source, and a second power supply circuit that supplies electric power from the second power generation device to the second load device.

In a case where electric power cannot be supplied from the first power generation device to the first load device, electric power is supplied from the second power generation device to the first load device by connecting the first power supply subsystem and the second power supply subsystem. When the first power supply subsystem and the second power supply subsystem are connected, if the difference between the voltage of the first power supply subsystem and the voltage of the second power supply subsystem is relatively large, an overcurrent may flow through the power supply system.

In the present disclosure, when the first power supply circuit and the second power supply circuit are connected, it is possible to prevent an overcurrent from flowing in the power supply system. Hereinafter, the power supply system of the present disclosure will be described.

First Embodiment

[Configuration of Power Supply System]

Figure 1:
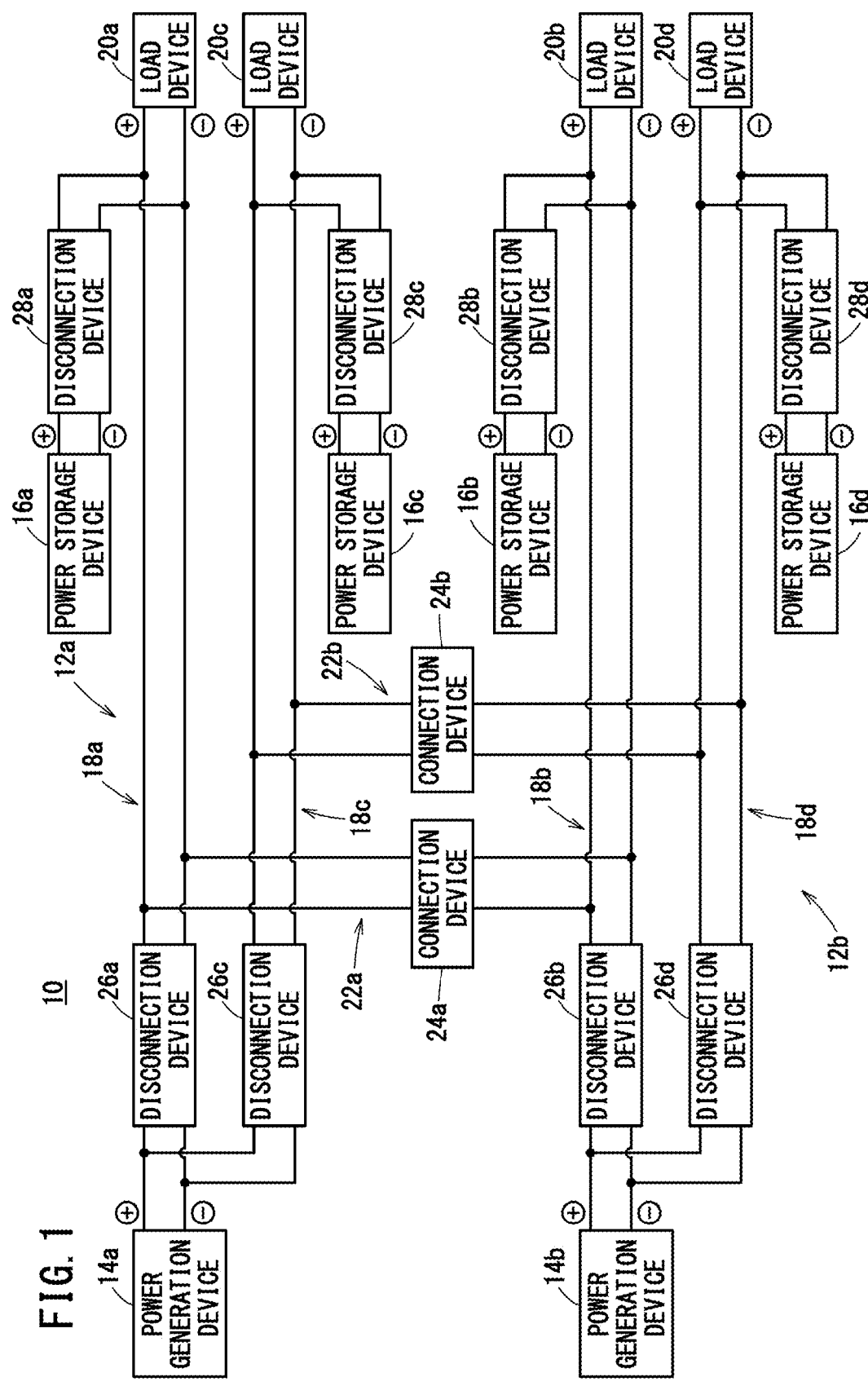
FIG. 1 is a schematic diagram of a power supply system according to a first embodiment.

FIG. 1 is a schematic diagram of a power supply system 10 according to a first embodiment. The power supply system 10 includes a first power supply subsystem 12*a* and a second power supply subsystem 12*b*. The first power supply subsystem 12*a* includes a first power generation device 14*a* serving as a main power source, and a first power storage device 16*a* and a third power storage device 16*c* serving as auxiliary power sources. The second power supply subsystem 12*b* includes a second power generation device 14*b* serving as a main power source, and a second power storage device 16*b* and a fourth power storage device 16*d* serving as auxiliary power sources.

The first power supply subsystem 12*a* includes a first power supply circuit 18*a* and a third power supply circuit 18*c*. The first power supply circuit 18*a* supplies, to a first load device 20*a*, DC power output from the first power generation device 14*a*. The third power supply circuit 18*c* supplies, to a third load device 20*c*, the DC power output from the first power generation device 14*a*.

The second power supply subsystem 12*b* includes a second power supply circuit 18*b* and a fourth power supply circuit 18*d*. The second power supply circuit 18*b* supplies, to a second load device 20*b*, DC power output from the second power generation device 14*b*. The fourth power supply circuit 18*d* supplies, to a fourth load device 20*d*, the DC power output from the second power generation device 14*b*.

The first power generation device 14*a* and the second power generation device 14*b* each include an engine, a generator, and a power control unit (all of them not shown). The engine drives the generator, and the generator generates three-phase AC power. The power control unit converts the three-phase AC power into DC power.

The first power generation device 14*a* and the second power generation device 14*b* may each include various sensors such as a voltage sensor and a current sensor, and elements such as a fuse, a relay, a breaker, a diode, a transistor, a resistor, a coil, and a capacitor.

The first load device 20*a*, the second load device 20*b*, the third load device 20*c*, and the fourth load device 20*d* each include an inverter and an electric motor (both of them not shown). The inverter converts the input DC power into three-phase AC power, and the electric motor is driven by the three-phase AC power. The first load device 20*a*, the second load device 20*b*, the third load device 20*c*, and the fourth load device 20*d* may each include a DC/DC converter and a low-voltage drive device (both of them not shown). The DC/DC converter steps down the voltage of the input DC power, and the low-voltage drive device is driven by the DC power whose voltage has been stepped down.

The first load device 20*a*, the second load device 20*b*, the third load device 20*c*, and the fourth load device 20*d* may each include various sensors such as a voltage sensor and a current sensor, and elements such as a fuse, a relay, a breaker, a diode, a transistor, a resistor, a coil, and a capacitor.

The power supply system 10 includes a first connection circuit 22a and a second connection circuit 22b. The first connection circuit 22a includes a first connection device 24a capable of connecting the first power supply circuit 18a and the second power supply circuit 18b. The second connection circuit 22b includes a second connection device 24b capable of connecting the third power supply circuit 18c and the fourth power supply circuit 18d.

The first connection device 24a and the second connection device 24b each include a contactor. The first connection device 24a and the second connection device 24b may each include a relay. The first connection device 24a and the second connection device 24b may each include a breaker. The first connection device 24a and the second connection device 24b may each include a semiconductor switch.

Normally, the first power supply circuit 18a and the second power supply circuit 18b are disconnected by the first connection device 24a, and the third power supply circuit 18c and the fourth power supply circuit 18d are disconnected by the second connection device 24b. That is, the first power supply subsystem 12a and the second power supply subsystem 12b are not connected to each other. Consequently, in a case where an abnormality occurs in one of the first power supply subsystem 12a or the second power supply subsystem 12b, the other can be prevented from being affected by the abnormality. For example, even when a short circuit occurs in the first power supply subsystem 12a and the first load device 20a and the third load device 20c cannot be driven, the second load device 20b and the fourth load device 20d of the second power supply subsystem 12b can continue to be driven.

In a case where the supply of electric power from the first power generation device 14a to the first power supply circuit 18a and the third power supply circuit 18c is cut off, the first power supply circuit 18a and the second power supply circuit 18b are connected by the first connection device 24a. Further, the third power supply circuit 18c and the fourth power supply circuit 18d are connected by the second connection device 24b. As a result, electric power is supplied from the second power generation device 14b to the first power supply circuit 18a and the third power supply circuit 18c.

In a case where the supply of electric power from the second power generation device 14b to the second power supply circuit 18b and the fourth power supply circuit 18d is cut off, the first power supply circuit 18a and the second power supply circuit 18b are connected by the first connection device 24a. Further, the third power supply circuit 18c and the fourth power supply circuit 18d are connected by the second connection device 24b. As a result, electric power is supplied from the first power generation device 14a to the second power supply circuit 18b and the fourth power supply circuit 18d.

The power supply system 10 includes disconnection devices 26a to 26d. The disconnection device 26a can disconnect the first power generation device 14a from the first power supply circuit 18a and the first connection circuit 22a. The disconnection device 26b can disconnect the second power generation device 14b from the second power supply circuit 18b and the first connection circuit 22a. The disconnection device 26c can disconnect the first power generation device 14a from the third power supply circuit 18c and the second connection circuit 22b. The disconnection device 26d can disconnect the second power generation device 14b from the fourth power supply circuit 18d and the second connection circuit 22b.

The disconnection devices 26a to 26d each include a contactor. The disconnection devices 26a to 26d may each include a relay. The disconnection devices 26a to 26d may each include a breaker. The disconnection devices 26a to 26d may each include a semiconductor switch.

The first power storage device 16a is connected to the first power supply circuit 18a in parallel with the first power generation device 14a. The second power storage device 16b is connected to the second power supply circuit 18b in parallel with the second power generation device 14b. The third power storage device 16c is connected to the third power supply circuit 18c in parallel with the first power generation device 14a. The fourth power storage device 16d is connected to the fourth power supply circuit 18d in parallel with the second power generation device 14b.

The first power storage device 16a, the second power storage device 16b, the third power storage device 16c, and the fourth power storage device 16d each include a lithium ion battery. The first power storage device 16a, the second power storage device 16b, the third power storage device 16c, and the fourth power storage device 16d may each include a secondary battery other than the lithium ion battery. The first power storage device 16a, the second power storage device 16b, the third power storage device 16c, and the fourth power storage device 16d may each include a large-capacity capacitor.

The first power storage device 16a, the second power storage device 16b, the third power storage device 16c, and the fourth power storage device 16d may each include various sensors such as a voltage sensor and a current sensor, and elements such as a fuse, a relay, a breaker, a diode, a transistor, a resistor, a coil, and a capacitor.

The power supply system 10 includes disconnection devices 28a to 28d. The disconnection device 28a can disconnect the first power storage device 16a from the first power supply circuit 18a and the first load device 20a. The disconnection device 28b can disconnect the second power storage device 16b from the second power supply circuit 18b and the second load device 20b. The disconnection device 28c can disconnect the third power storage device 16c from the third power supply circuit 18c and the third load device 20c. The disconnection device 28d can disconnect the fourth power storage device 16d from the fourth power supply circuit 18d and the fourth load device 20d.

The disconnection devices 28a to 28d each include a contactor. The disconnection devices 28a to 28d may each include a relay. The disconnection devices 28a to 28d may each include a breaker. The disconnection devices 28a to 28d may each include a semiconductor switch.

As shown in FIG. 1, the first load device 20a and the third load device 20c are connected in parallel. Further, the first power generation device 14a and the first power storage device 16a are connected in parallel. Furthermore, the first power generation device 14a and the third power storage device 16c are connected in parallel. Therefore, if the amount of voltage drop in the first power supply circuit 18a and the third power supply circuit 18c is considered to be sufficiently small, the output voltage of the first power generation device 14a, the output voltage of the first power storage device 16a, the output voltage of the third power storage device 16c, the voltage applied to the first load device 20a, and the voltage applied to the third load device 20c are substantially equal to each other. Hereinafter, the output voltage of the first power generation device 14a, the output voltage of the first power storage device 16a, the output voltage of the third power storage device 16c, the voltage applied to the first load device 20a, and the voltage applied to the third load device 20c may be collectively referred to as the voltage of the first power supply subsystem 12a.

Similarly, the output voltage of the second power generation device 14b, the output voltage of the second power storage device 16b, the output voltage of the fourth power storage device 16d, the voltage applied to the second load device 20b, and the voltage applied to the fourth load device 20d are substantially equal to each other. Hereinafter, the output voltage of the second power generation device 14b, the output voltage of the second power storage device 16b, the output voltage of the fourth power storage device 16d, the voltage applied to the second load device 20b, and the voltage applied to the fourth load device 20d may be collectively referred to as the voltage of the second power supply subsystem 12b.

[Operation of Power Supply System in Normal State]

Figure 2:
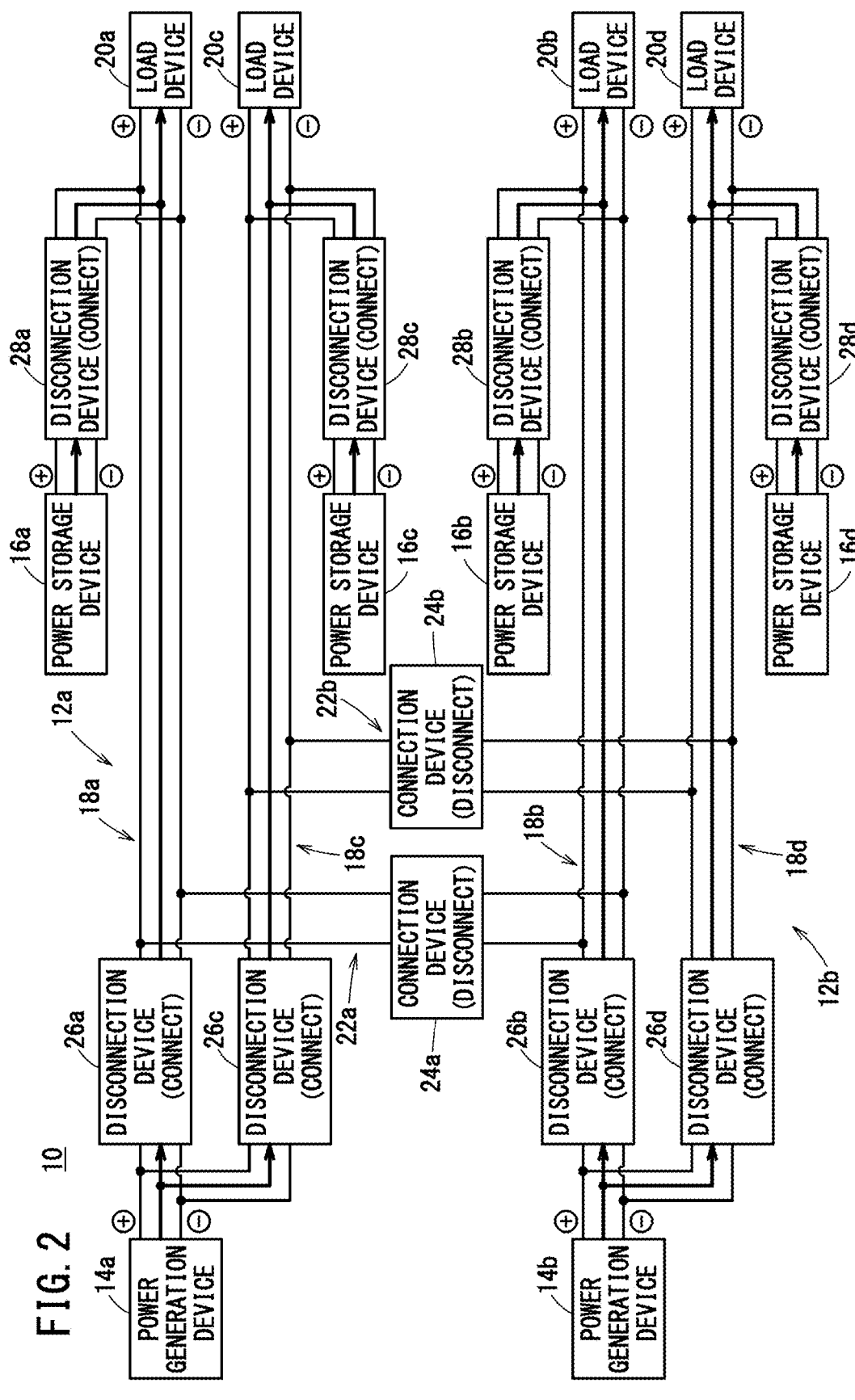
FIG. 2 is a diagram showing the operation of the power supply system of the first embodiment in the normal state.

FIG. 2 is a diagram showing the operation of the power supply system 10 of the first embodiment in the normal state. Arrows shown in FIG. 2 indicate electric power supply paths.

The connection between the first power supply circuit 18a and the second power supply circuit 18b is interrupted by the first connection device 24a, and the connection between the third power supply circuit 18c and the fourth power supply circuit 18d is interrupted by the second connection device 24b.

The first power generation device 14a is connected to the first power supply circuit 18a and the first connection circuit 22a by the disconnection device 26a, and the first power generation device 14a is connected to the third power supply circuit 18c and the second connection circuit 22b by the disconnection device 26c. As a result, electric power is supplied from the first power generation device 14a to the first load device 20a and the third load device 20c.

The first power storage device 16a is connected to the first load device 20a by the disconnection device 28a, and electric power is supplied from the first power storage device 16a to the first load device 20a. The third power storage device 16c is connected to the third load device 20c by the disconnection device 28c, and electric power is supplied from the third power storage device 16c to the third load device 20c.

The second power generation device 14b is connected to the second power supply circuit 18b and the first connection circuit 22a by the disconnection device 26b, and the second power generation device 14b is connected to the fourth power supply circuit 18d and the second connection circuit 22b by the disconnection device 26d. As a result, electric power is supplied from the second power generation device 14b to the second load device 20b and the fourth load device 20d.

The second power storage device 16b is connected to the second load device 20b by the disconnection device 28b, and electric power is supplied from the second power storage device 16b to the second load device 20b. The fourth power storage device 16d is connected to the fourth load device 20d by the disconnection device 28d, and electric power is supplied from the fourth power storage device 16d to the fourth load device 20d.

[Operation of Power Supply System in Event of Abnormality]

Figure 3:
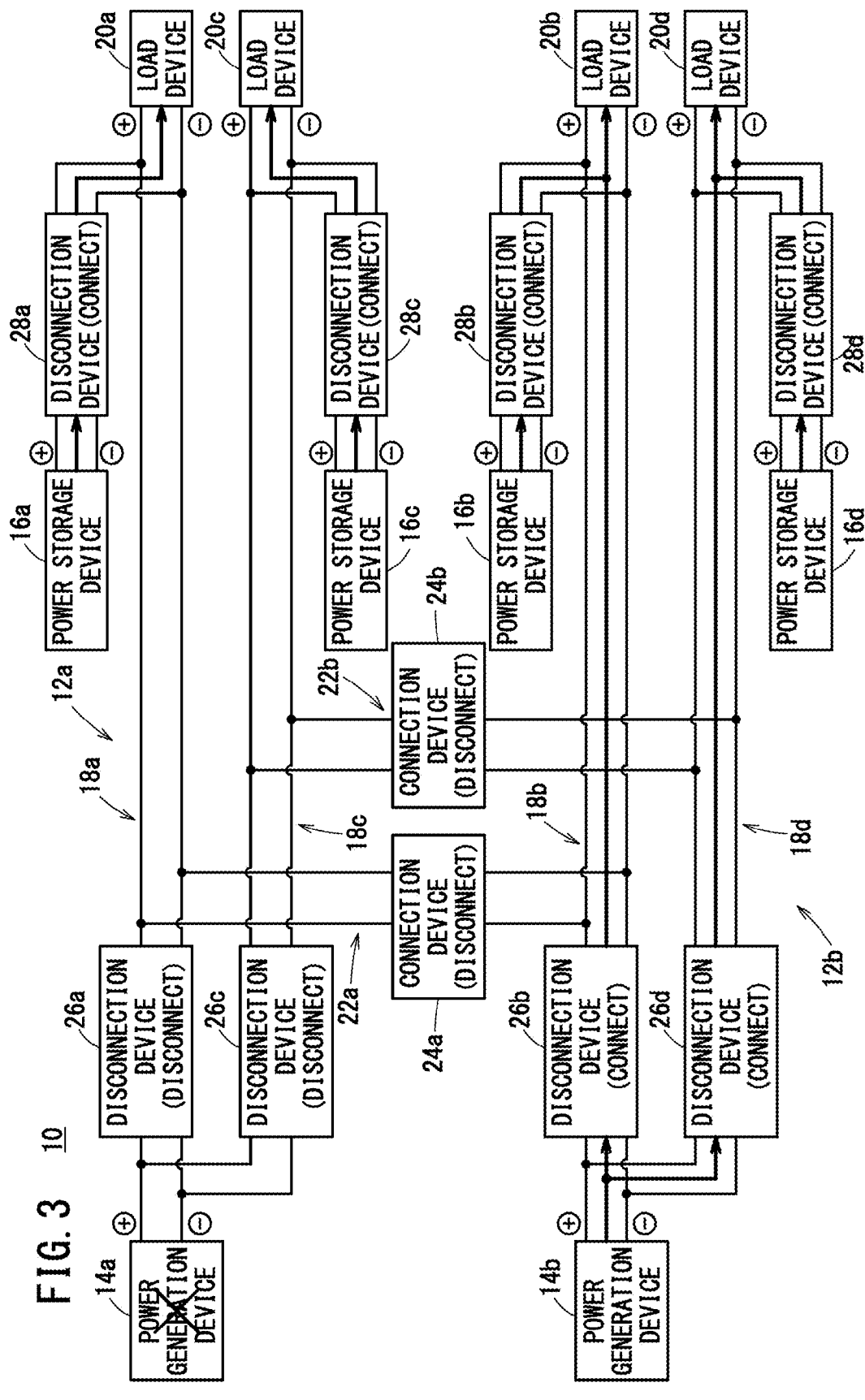
FIG. 3 is a diagram showing the operation of the power supply system of the first embodiment in the event of an abnormality.
Figure 4:
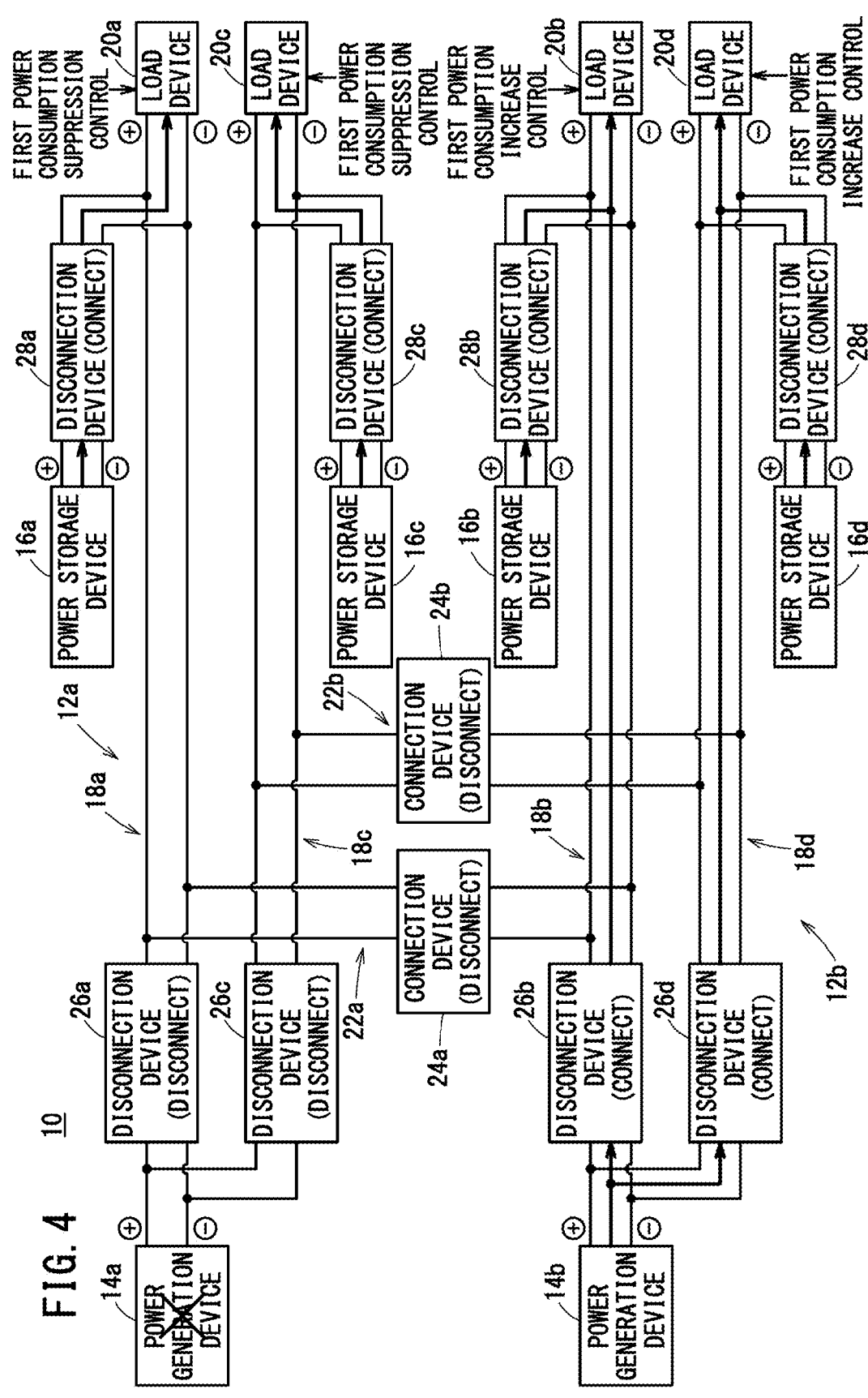
FIG. 4 is a diagram showing the operation of the power supply system of the first embodiment in the event of an abnormality.

FIGS. 3 to 5 are diagrams showing the operation of the power supply system 10 of the first embodiment in the event of an abnormality. Arrows shown in FIGS. 3 to 5 indicate power supply paths. FIGS. 3 to 5 show the operation of the power supply system 10 in a case where the supply of electric power from the first power generation device 14a to the first power supply circuit 18a and the third power supply circuit 18c is cut off.

The state in which the supply of electric power from the first power generation device 14a to the first power supply circuit 18a and the third power supply circuit 18c is cut off is, for example, a state in which the first power generation device 14a is stopped and cannot be restarted, or a state in which a short circuit, wire breaking (disconnection), or the like has occurred between the first power generation device 14a and the disconnection device 26a, and between the first power generation device 14a and the disconnection device 26c.

In a case where the supply of electric power from the first power generation device 14a to the first power supply circuit 18a and the third power supply circuit 18c is cut off, then as shown in FIG. 3, the first power generation device 14a is disconnected from the first power supply circuit 18a and the first connection circuit 22a by the disconnection device 26a. Further, the first power generation device 14a is disconnected from the third power supply circuit 18c and the second connection circuit 22b by the disconnection device 26c.

In a case where there is a difference between the voltage of the first power supply subsystem 12a and the voltage of the second power supply subsystem 12b, then as shown in FIG. 4, the power supply system 10 of the first embodiment executes first power consumption suppression control on the first load device 20a and the third load device 20c, and executes first power consumption increase control on the second load device 20b and the fourth load device 20d.

The first power consumption suppression control and the first power consumption increase control are executed to approximate the voltage of the first power supply subsystem 12a and the voltage of the second power supply subsystem 12b. The first power consumption suppression control, the first power consumption increase control, and the approximating of the voltage of the first power supply subsystem 12a and the voltage of the second power supply subsystem 12b will be described in detail later.

After the voltage of the first power supply subsystem 12a and the voltage of the second power supply subsystem 12b are approximated to each other, the power supply system 10 of the first embodiment executes first connection control on the first connection device 24a and executes second connection control on the second connection device 24b, as shown in FIG. 5. As a result, the first power supply circuit 18a and the second power supply circuit 18b are connected by the first connection device 24a, and the third power supply circuit 18c and the fourth power supply circuit 18d are connected by the second connection device 24b. Therefore, electric power is supplied from the second power generation device 14b to the first power supply circuit 18a, and electric power is supplied from the second power generation device 14b to the third power supply circuit 18c.

[Configuration of Control Device]

The power supply system 10 includes a control device 30. FIG. 6 is a control block diagram of the control device 30 in the first embodiment.

The control device 30 includes a computation unit 32 and a storage unit 34. The computation unit 32 is, for example, a processor such as a central processing unit (CPU) or a graphics processing unit (GPU). The computation unit 32 controls each device by executing a program stored in the storage unit 34. At least part of the computation unit 32 may be realized by an integrated circuit such as an application specific integrated circuit (ASIC) or a field-programmable gate array (FPGA). At least part of the computation unit 32 may be realized by an electronic circuit including a discrete device.

The storage unit 34 is constituted by a volatile memory (not shown) and a non-volatile memory (not shown) which are computer-readable storage media. The volatile memory is, for example, a random access memory (RAM) or the like. The non-volatile memory is, for example, a read only memory (ROM), a flash memory, or the like. Data and the like are stored in, for example, the volatile memory. Programs, tables, maps, and the like are stored in, for example, the non-volatile memory. At least part of the storage unit 34 may be included in the processor, the integrated circuit, or the like described above.

The control device 30 controls the first load device 20*a*, the second load device 20*b*, the third load device 20*c*, the fourth load device 20*d*, the first connection device 24*a*, the second connection device 24*b*, the disconnection devices 26*a* to 26*d*, and the disconnection devices 28*a* to 28*d*. The first load device 20*a*, the second load device 20*b*, the third load device 20*c*, the fourth load device 20*d*, the first connection device 24*a*, the second connection device 24*b*, the disconnection devices 26*a* to 26*d*, and the disconnection devices 28*a* to 28*d* may be controlled by a plurality of the control devices 30. For example, the first load device 20*a*, the second load device 20*b*, the third load device 20*c*, and the fourth load device 20*d* may be controlled by one control device 30, and the first connection device 24*a*, the second connection device 24*b*, the disconnection devices 26*a* to 26*d*, and the disconnection devices 28*a* to 28*d* may be controlled by another control device 30.

[Fail-Safe Control]

FIG. 7 is a flowchart showing fail-safe control of the first embodiment. The fail-safe control is repeatedly executed at a predetermined cycle.

In step S1, the control device 30 determines whether or not the supply of electric power from the first power generation device 14*a* to the first power supply circuit 18*a* and the third power supply circuit 18*c* has been cut off. In a case where it is determined that the supply of electric power from the first power generation device 14*a* to the first power supply circuit 18*a* and the third power supply circuit 18*c* has been cut off (step S1: YES), the process proceeds to step S2.

In step S2, the control device 30 controls the disconnection device 26*a* to disconnect the first power generation device 14*a* from the first power supply circuit 18*a* and the first connection circuit 22*a*. Thereafter, the process proceeds to step S3.

In step S3, the control device 30 controls the disconnection device 26*c* to disconnect the first power generation device 14*a* from the third power supply circuit 18*c* and the second connection circuit 22*b*. Thereafter, the process proceeds to step S4.

In step S4, the control device 30 determines whether or not the difference between the voltage of the first power supply subsystem 12*a* and the voltage of the second power supply subsystem 12*b* is less than a first voltage threshold. In a case where it is determined that the difference between the voltage of the first power supply subsystem 12*a* and the voltage of the second power supply subsystem 12*b* is equal to or greater than the first voltage threshold (step S4: NO), the process proceeds to step S5. The first voltage threshold is determined in advance according to the magnitude of the current that each apparatus and each device of the power supply system 10 can withstand.

In step S5, the control device 30 executes the first power consumption suppression control on the first load device 20*a* and the third load device 20*c*. The first power consumption suppression control is control for suppressing the power consumption of the first load device 20*a* and the power consumption of the third load device 20*c* by reducing the required electric power of (electric power required by) the first load device 20*a* and the required electric power of the third load device 20*c*. Thereafter, the process proceeds to step S6.

In step S6, the control device 30 executes the first power consumption increase control on the second load device 20*b* and the fourth load device 20*d*. The first power consumption increase control is control for increasing the power consumption of the second load device 20*b* and the power consumption of the fourth load device 20*d* by increasing the required electric power of the second load device 20*b* and the required electric power of the fourth load device 20*d*. Thereafter, the process proceeds to step S7.

In step S7, the control device 30 determines whether or not the difference between the voltage of the first power supply subsystem 12*a* and the voltage of the second power supply subsystem 12*b* is equal to or less than a second voltage threshold. In a case where it is determined that the difference between the voltage of the first power supply subsystem 12*a* and the voltage of the second power supply subsystem 12*b* is greater than the second voltage threshold (step S7: NO), the process returns to step S5. The second voltage threshold is determined in advance according to the magnitude of the current that each apparatus and each device of the power supply system 10 can withstand. The second voltage threshold may be the same value as the first voltage threshold described above, or may be a value different from the first voltage threshold.

In a case where it is determined in the above-described step S4 that the difference between the voltage of the first power supply subsystem 12*a* and the voltage of the second power supply subsystem 12*b* is less than the first voltage threshold (step S4: YES), or in a case where it is determined in the immediately preceding step S7 that the difference between the voltage of the first power supply subsystem 12*a* and the voltage of the second power supply subsystem 12*b* is equal to or less than the second voltage threshold (step S7: YES), the process proceeds to step S8.

In step S8, the control device 30 executes the first connection control on the first connection device 24*a*. As a result, the first power supply circuit 18*a* and the second power supply circuit 18*b* are connected via the first connection circuit 22*a*. Thereafter, the process proceeds to step S9.

In step S9, the control device 30 executes the second connection control on the second connection device 24*b*. As a result, the third power supply circuit 18*c* and the fourth power supply circuit 18*d* are connected via the second connection circuit 22*b*. Thereafter, the fail-safe control is ended.

In the above-described step S1, in a case where it is determined that electric power is being supplied from the first power generation device 14*a* to the first power supply circuit 18*a* and the third power supply circuit 18*c* (step S1: NO), the process proceeds to step S10.

In step S10, the control device 30 determines whether or not the supply of electric power from the second power generation device 14*b* to the second power supply circuit 18*b* and the fourth power supply circuit 18*d* has been cut off. In a case where it is determined that the supply of electric power from the second power generation device 14*b* to the second power supply circuit 18*b* and the fourth power supply circuit 18*d* has been cut off (step S10: YES), the process proceeds to step S11. In a case where it is determined that electric power is being supplied from the second power generation device 14*b* to the second power supply circuit 18*b* and the fourth power supply circuit 18*d* (step S10: NO), the fail-safe control is ended.

In step S11, the control device 30 controls the disconnection device 26*b* to disconnect the second power generation device 14*b* from the second power supply circuit 18*b* and the first connection circuit 22*a*. Thereafter, the process proceeds to step S12.

In step S12, the control device 30 controls the disconnection device 26*d* to disconnect the second power generation device 14*b* from the fourth power supply circuit 18*d* and the second connection circuit 22*b*. Thereafter, the process proceeds to step S13.

In step S13, the control device 30 determines whether or not the difference between the voltage of the first power supply subsystem 12*a* and the voltage of the second power supply subsystem 12*b* is less than the first voltage threshold. In a case where it is determined that the difference between the voltage of the first power supply subsystem 12*a* and the voltage of the second power supply subsystem 12*b* is equal to or greater than the first voltage threshold (step S13: NO), the process proceeds to step S14.

In step S14, the control device 30 executes second power consumption suppression control on the second load device 20*b* and the fourth load device 20*d*. The second power consumption suppression control is control for suppressing the power consumption of the second load device 20*b* and the power consumption of the fourth load device 20*d* by reducing the required electric power of the second load device 20*b* and the required electric power of the fourth load device 20*d*. Thereafter, the process proceeds to step S15.

In step S15, the control device 30 executes second power consumption increase control on the first load device 20*a* and the third load device 20*c*. The second power consumption increase control is control for increasing the power consumption of the first load device 20*a* and the power consumption of the third load device 20*c* by increasing the required electric power of the first load device 20*a* and the required electric power of the third load device 20*c*. Thereafter, the process proceeds to step S16.

In step S16, the control device 30 determines whether or not the difference between the voltage of the first power supply subsystem 12*a* and the voltage of the second power supply subsystem 12*b* is equal to or less than the second voltage threshold. In a case where it is determined that the difference between the voltage of the first power supply subsystem 12*a* and the voltage of the second power supply subsystem 12*b* is greater than the second voltage threshold (step S16: NO), the process returns to step S14.

In a case where it is determined in the above-described step S13 that the difference between the voltage of the first power supply subsystem 12*a* and the voltage of the second power supply subsystem 12*b* is less than the first voltage threshold (step S13: YES), or in a case where it is determined in the immediately preceding step S16 that the difference between the voltage of the first power supply subsystem 12*a* and the voltage of the second power supply subsystem 12*b* is equal to or less than the second voltage threshold (step S16: YES), the process proceeds to step S17.

In step S17, the control device 30 executes the first connection control on the first connection device 24*a*. As a result, the first power supply circuit 18*a* and the second power supply circuit 18*b* are connected via the first connection circuit 22*a*. Thereafter, the process proceeds to step S18.

In step S18, the control device 30 executes the second connection control on the second connection device 24*b*. As a result, the third power supply circuit 18*c* and the fourth power supply circuit 18*d* are connected via the second connection circuit 22*b*. Thereafter, the fail-safe control is ended.

[Approximating of Voltage of First Power Supply Subsystem and Voltage of Second Power Supply Subsystem]

In the power supply system 10 of the first embodiment, in a case where there is a difference between the voltage of the first power supply subsystem 12*a* and the voltage of the second power supply subsystem 12*b*, the voltage of the first power supply subsystem 12*a* and the voltage of the second power supply subsystem 12*b* are approximated to each other before the first power supply subsystem 12*a* and the second power supply subsystem 12*b* are connected.

The following describes the state of the power supply system 10 in a case where the first power supply subsystem 12*a* and the second power supply subsystem 12*b* are connected in a state where there is a difference between the voltage of the first power supply subsystem 12*a* and the voltage of the second power supply subsystem 12*b*.

FIGS. 8A to 8C are graphs each showing a temporal change in the state of the power supply system 10 in periods before and after a time point at which the first power supply subsystem 12*a* and the second power supply subsystem 12*b* are connected. The graph of FIG. 8A shows a temporal change in the voltage of the first power supply subsystem 12*a* and a temporal change in the voltage of the second power supply subsystem 12*b*. The graph of FIG. 8B shows temporal changes in the required electric power of the first load device 20*a*, the required electric power of the second load device 20*b*, the required electric power of the third load device 20*c*, and the required electric power of the fourth load device 20*d*. The graph of FIG. 8C shows a temporal change in the current flowing through the first connection circuit 22*a* and the second connection circuit 22*b*. In each of the graphs of FIGS. 8A to 8C, temporal changes in the voltage, electric power, and current are schematically shown.

At a time point t1, the supply of electric power from the first power generation device 14*a* is cut off, and at a time point t2, the first power supply circuit 18*a* and the second power supply circuit 18*b* are connected, and the third power supply circuit 18*c* and the fourth power supply circuit 18*d* are connected. In the periods indicated in the graphs of FIGS. 8A to 8C, the required electric power of the first load device 20*a*, the required electric power of the second load device 20*b*, the required electric power of the third load device 20*c*, and the required electric power of the fourth load device 20*d* are constant.

In the period before the time point t1, the output electric power of the first power generation device 14*a* matches the sum of the required electric power of the first load device 20*a* and the required electric power of the third load device 20*c*, and the first power storage device 16*a* and the third power storage device 16*c* are not charged or discharged. Further, in the period before the time point t1, the output electric power of the second power generation device 14*b* matches the sum of the required electric power of the second load device 20*b* and the required electric power of the fourth load device 20*d*, and the second power storage device 16*b* and the fourth power storage device 16*d* are not charged or discharged.

Since the supply of electric power from the first power generation device 14*a* is cut off at the time point t1, the first power storage device 16*a* and the third power storage device 16*c* start discharging at the time point t1. The start of the discharge of the first power storage device 16*a* increases the output electric power of the first power storage device 16*a*, and increases the output current of the first power storage device 16*a*. Therefore, the amount of voltage drop due to the internal resistance increases in the first power storage device 16*a*, and the output voltage of the first power storage device 16*a* decreases. In addition, the start of the discharge of the third power storage device 16*c* increases the output electric power of the third power storage device 16*c*, and increases the output current of the third power storage device 16*c*. Therefore, the amount of voltage drop due to the internal resistance increases in the third power storage device 16*c*, and the output voltage of the third power storage device 16*c* decreases. That is, the voltage of the first power supply subsystem 12*a* decreases (a portion indicated by a reference sign P in FIG. 8A).

Further, in the period from the time point t1 to the time point t2, electric power is supplied from the first power storage device 16*a* to the first load device 20*a*, and electric power is supplied from the third power storage device 16*c* to the third load device 20*c*. That is, in the period from the time point t1 to the time point t2, the first power storage device 16*a* and the third power storage device 16*c* are discharged, and therefore, the state of charge (SOC) of the first power storage device 16*a* and the SOC of the third power storage device 16*c* gradually decrease. As the SOCs decrease, the open-end voltage of the first power storage device 16*a* and the open-end voltage of the third power storage device 16*c* decrease, and the output voltage of the first power storage device 16*a* and the output voltage of the third power storage device 16*c* gradually decrease. That is, the voltage of the first power supply subsystem 12*a* gradually decreases (a portion indicated by a reference sign Q in FIG. 8A).

On the other hand, in the period from the time point t1 to the time point t2, electric power is supplied from the second power generation device 14*b* to the second load device 20*b* and the fourth load device 20*d*. That is, in the period from the time point t1 to the time point t2, the second power storage device 16*b* and the fourth power storage device 16*d* are not charged or discharged. Therefore, the output current of the second power storage device 16*b* and the output current of the fourth power storage device 16*d* do not change, and the amount of voltage drop due to the internal resistance does not change in the second power storage device 16*b* and the fourth power storage device 16*d*. Further, the SOC of the second power storage device 16*b* and the SOC of the fourth power storage device 16*d* are maintained. Therefore, the output voltage of the second power storage device 16*b* and the output voltage of the fourth power storage device 16*d* are maintained. That is, the voltage of the second power supply subsystem 12*b* is maintained.

Since the voltage of the first power supply subsystem 12*a* decreases and the voltage of the second power supply subsystem 12*b* is maintained, the difference between the voltage of the first power supply subsystem 12*a* and the voltage of the second power supply subsystem 12*b* increases. Therefore, at the time point t2, when the first power supply circuit 18*a* and the second power supply circuit 18*b* are connected and the third power supply circuit 18*c* and the fourth power supply circuit 18*d* are connected, an overcurrent flows in the power supply system 10. The overcurrent may damage each apparatus and each device of the power supply system 10. In addition, in a case where each apparatus and each device of the power supply system

10 is designed to withstand an overcurrent, there is a problem in that the manufacturing cost of the power supply system 10 increases.

The following describes the state of the power supply system 10 in a case where the first power supply subsystem 12*a* and the second power supply subsystem 12*b* are connected after the voltage of the first power supply subsystem 12*a* and the voltage of the second power supply subsystem 12*b* are approximated to each other.

FIGS. 9A to 9C are graphs each showing a temporal change in the state of the power supply system 10 in periods before and after a time point at which the first power supply subsystem 12*a* and the second power supply subsystem 12*b* are connected. The graph of FIG. 9A shows a temporal change in the voltage of the first power supply subsystem 12*a* and a temporal change in the voltage of the second power supply subsystem 12*b*. The graph of FIG. 9B shows temporal changes in the required electric power of the first load device 20*a*, the required electric power of the second load device 20*b*, the required electric power of the third load device 20*c*, and the required electric power of the fourth load device 20*d*. The graph of FIG. 9C shows a temporal change in the current flowing through the first connection circuit 22*a* and the second connection circuit 22*b*. In each of the graphs of FIGS. 9A to 9C, temporal changes in the voltage, electric power, and current are schematically shown.

At a time point t11, the supply of electric power from the first power generation device 14*a* is cut off, and at a time point t12, the first power consumption suppression control is executed on the first load device 20*a* and the third load device 20*c*, and the first power consumption increase control is executed on the second load device 20*b* and the fourth load device 20*d*.

In the period before the time point t11, the output electric power of the first power generation device 14*a* matches the sum of the required electric power of the first load device 20*a* and the required electric power of the third load device 20*c*, and the first power storage device 16*a* and the third power storage device 16*c* are not charged or discharged. Further, in the period before the time point t11, the output electric power of the second power generation device 14*b* matches the sum of the required electric power of the second load device 20*b* and the required electric power of the fourth load device 20*d*, and the second power storage device 16*b* and the fourth power storage device 16*d* are not charged or discharged.

Similarly to the period from the time point t1 to the time point t2 in FIG. 8A, in the period from the time point t11 to the time point t12 in FIG. 9A, the voltage of the first power supply subsystem 12*a* decreases, and the voltage of the second power supply subsystem 12*b* is maintained. Therefore, the difference between the voltage of the first power supply subsystem 12*a* and the voltage of the second power supply subsystem 12*b* increases.

In the power supply system 10 of the first embodiment, at the time point t12, the first power consumption suppression control is executed on the first load device 20*a* and the third load device 20*c*. The required electric power of the first load device 20*a* and the required electric power of the third load device 20*c* are gradually reduced by the first power consumption suppression control. As a result, the output electric power of the first power storage device 16*a* and the output electric power of the third power storage device 16*c* gradually decrease, and the output current of the first power storage device 16*a* and the output current of the third power storage device 16*c* gradually decrease. Therefore, the amount of voltage drop due to the internal resistance gradually decreases in the first power storage device 16*a* and the third power storage device 16*c*. Further, compared to the period from the time point t11 to the time point t12, the required electric power of the first load device 20*a* and the required electric power of the third load device 20*c* are reduced in the period from the time point t12 to a time point t13, and therefore, the decrease in the SOC of the first power storage device 16*a* and the decrease in the SOC of the third power storage device 16*c* are suppressed.

As described above, the first power consumption suppression control reduces the amount of voltage drop due to the internal resistance in the first power storage device 16*a* and the third power storage device 16*c*, and also suppresses the decrease in the SOC of the first power storage device 16*a* and the decrease in the SOC of the third power storage device 16*c* to thereby suppress the decrease in the output voltage of the first power storage device 16*a* and the decrease in the output voltage of the third power storage device 16*c*. That is, the decrease in the voltage of the first power supply subsystem 12*a* is suppressed.

In addition, in the power supply system 10 of the first embodiment, the first power consumption increase control is executed on the second load device 20*b* and the fourth load device 20*d* at the time point t12. The required electric power of the second load device 20*b* and the required electric power of the fourth load device 20*d* are gradually increased by the first power consumption increase control.

In accordance with the increase in the required electric power of the second load device 20*b* and the required electric power of the fourth load device 20*d*, the second power generation device 14*b* is controlled to increase its output electric power. However, since the response speed of the output electric power of the second power generation device 14*b* is relatively slow, the output electric power of the second power generation device 14*b* is insufficient for the required electric power of the second load device 20*b* and the required electric power of the fourth load device 20*d* for a while after the required electric power of the second load device 20*b* and the required electric power of the fourth load device 20*d* are increased.

The electric power corresponding to the shortage is supplied from the second power storage device 16*b* to the second load device 20*b*, and is supplied from the fourth power storage device 16*d* to the fourth load device 20*d*. As the required electric power of the second load device 20*b* gradually increases, the output electric power of the second power storage device 16*b* gradually increases, and the output current of the second power storage device 16*b* gradually increases. Therefore, the amount of voltage drop due to the internal resistance gradually increases in the second power storage device 16*b*. Further, as the required electric power of the fourth load device 20*d* gradually increases, the output electric power of the fourth power storage device 16*d* gradually increases, and the output current of the fourth power storage device 16*d* gradually increases. Therefore, the amount of voltage drop due to the internal resistance gradually increases in the fourth power storage device 16*d*.

In addition, in the period from the time point t12 to the time point t13, the second power storage device 16*b* and the fourth power storage device 16*d* are discharged, and therefore, the decrease in the SOC of the second power storage device 16*b* and the decrease in the SOC of the fourth power storage device 16*d* are promoted.

As described above, the first power consumption increase control gradually increases the amount of voltage drop due to the internal resistance in the second power storage device

16*b* and the fourth power storage device 16*d*, and also promotes the decrease in the SOC of the second power storage device 16*b* and the decrease in the SOC of the fourth power storage device 16*d* to thereby promote the decrease in the output voltage of the second power storage device 16*b* and the decrease in the output voltage of the fourth power storage device 16*d*. That is, the decrease in the voltage of the second power supply subsystem 12*b* is promoted.

By promoting the decrease in the voltage of the second power supply subsystem 12*b* and suppressing the decrease in the voltage of the first power supply subsystem 12*a*, the voltage of the second power supply subsystem 12*b* can be approximated to the voltage of the first power supply subsystem 12*a*. At the time point t13 at which the voltage of the first power supply subsystem 12*a* and the voltage of the second power supply subsystem 12*b* are approximate to each other, the first power supply circuit 18*a* and the second power supply circuit 18*b* are connected, and the third power supply circuit 18*c* and the fourth power supply circuit 18*d* are connected. As a result, it is possible to prevent an overcurrent from flowing in the power supply system 10. Therefore, damage to each apparatus and each device of the power supply system 10 is suppressed. Further, it is not necessary to design each apparatus and each device of the power supply system 10 to withstand an overcurrent, and therefore, it is possible to suppress the manufacturing cost of the power supply system 10.

It should be noted that, in a case where the first power consumption suppression control is executed on the first load device 20*a* and the third load device 20*c*, the output of the first load device 20*a* and the output of the third load device 20*c* decrease. On the other hand, in a case where the first power consumption increase control is executed on the second load device 20*b* and the fourth load device 20*d*, the output of the second load device 20*b* and the output of the fourth load device 20*d* increase. As a result, the output of the whole of the first load device 20*a*, the second load device 20*b*, the third load device 20*c*, and the fourth load device 20*d* is maintained.

The case where the supply of electric power from the first power generation device 14*a* is cut off has been described above, and also in a case where the supply of electric power from the second power generation device 14*b* is cut off, the first power supply subsystem 12*a* and the second power supply subsystem 12*b* are connected after the voltage of the first power supply subsystem 12*a* and the voltage of the second power supply subsystem 12*b* are approximated to each other.

In a case where the supply of electric power from the second power generation device 14*b* has been cut off, the second power consumption suppression control is executed on the second load device 20*b* and the fourth load device 20*d*, and the second power consumption increase control is executed on the first load device 20*a* and the third load device 20*c*. As a result, the voltage of the first power supply subsystem 12*a* and the voltage of the second power supply subsystem 12*b* are approximated to each other.

[Comparison with Power Supply System of Comparative Example]

FIG. 10 is a schematic diagram of a power supply system 100 according to a comparative example. The power supply system 100 of the comparative example includes voltage conversion devices 30*a* to 30*d*. The voltage conversion devices 30*a* to 30*d* are DC/DC converters.

In the power supply system 100, the output voltages of the voltage conversion devices 30*a* to 30*d* are substantially equalized. Therefore, when the first power supply circuit 18*a* and the second power supply circuit 18*b* are connected by the first connection device 24*a*, it is possible to prevent an overcurrent from flowing through the first power supply circuit 18*a* and the second power supply circuit 18*b*. Similarly, when the third power supply circuit 18*c* and the fourth power supply circuit 18*d* are connected by the second connection device 24*b*, it is possible to prevent an overcurrent from flowing through the third power supply circuit 18*c* and the fourth power supply circuit 18*d*.

However, since the power supply system 100 includes the voltage conversion devices 30*a* to 30*d*, there are problems in that the number of components constituting the power supply system 100 increases, the weight of the power supply system 100 increases, and the manufacturing cost of the power supply system 100 increases. The power supply system 10 of the first embodiment does not include the voltage conversion devices 30*a* to 30*d*, and therefore, it is possible to reduce the number of components constituting the power supply system 10, to achieve a reduction in the weight of the power supply system 10, and to suppress the manufacturing cost of the power supply system 10.

Second Embodiment

The configuration of the power supply system 10 of a second embodiment is the same as the configuration of the power supply system 10 of the first embodiment. However, the fail-safe control executed by the control device 30 of the second embodiment is partially different from the fail-safe control executed by the control device 30 of the first embodiment.

[Operation of Power Supply System in Event of Abnormality]

FIGS. 11 to 13 are diagrams showing the operation of the power supply system 10 of the second embodiment in the event of an abnormality. Arrows shown in FIGS. 11 to 13 indicate electric power supply paths. FIGS. 11 to 13 show the operation of the power supply system 10 in a case where the supply of electric power from the first power generation device 14*a* to the first load device 20*a* is stopped.

The state in which the supply of electric power from the first power generation device 14*a* to the first load device 20*a* is stopped is, for example, a state in which the first load device 20*a* is stopped and cannot be restarted, or a state in which a short circuit, wire breaking (disconnection), or the like has occurred between the disconnection device 26*a* and the first load device 20*a*.

In a case where the supply of electric power from the first power generation device 14*a* to the first load device 20*a* is stopped, then as shown in FIG. 11, the first power generation device 14*a* is disconnected from the first power supply circuit 18*a* and the first connection circuit 22*a* by the disconnection device 26*a*.

In a case where there is a difference between the voltage of the first power supply subsystem 12*a* and the voltage of the second power supply subsystem 12*b*, then as shown in FIG. 12, the power supply system 10 of the second embodiment executes second power consumption suppression control on the second load device 20*b* and the fourth load device 20*d*, and executes second power consumption increase control on the third load device 20*c*.

The second power consumption suppression control and the second power consumption increase control are executed to approximate the voltage of the first power supply subsystem 12*a* and the voltage of the second power supply subsystem 12*b*. The second power consumption suppression control, the second power consumption increase control, and the approximating of the voltage of the first power supply subsystem 12*a* and the voltage of the second power supply subsystem 12*b* will be described in detail later.

After the voltage of the first power supply subsystem 12*a* and the voltage of the second power supply subsystem 12*b* are approximated to each other, second connection control is executed on the second connection device 24*b*. As shown in FIG. 13, the third power supply circuit 18*c* and the fourth power supply circuit 18*d* are connected by the second connection device 24*b*. As a result, electric power is supplied from the first power generation device 14*a* to the fourth power supply circuit 18*d*.

[Fail-Safe Control]

FIGS. 14 and 15 are flowcharts showing the fail-safe control. The fail-safe control is repeatedly executed at a predetermined cycle.

In step S21, the control device 30 determines whether or not the supply of electric power from the first power generation device 14*a* to the first load device 20*a* has been stopped. In a case where it is determined that the supply of electric power from the first power generation device 14*a* to the first load device 20*a* has been stopped (step S21: YES), the process proceeds to step S22.

In step S22, the control device 30 controls the disconnection device 26*a* to disconnect the first power generation device 14*a* from the first power supply circuit 18*a* and the first connection circuit 22*a*. Thereafter, the process proceeds to step S23.

In step S23, the control device 30 determines whether or not the difference between the voltage of the first power supply subsystem 12*a* and the voltage of the second power supply subsystem 12*b* is less than a first voltage threshold. In a case where it is determined that the difference between the voltage of the first power supply subsystem 12*a* and the voltage of the second power supply subsystem 12*b* is equal to or greater than the first voltage threshold (step S23: NO), the process proceeds to step S24.

In step S24, the control device 30 executes second power consumption suppression control on the second load device 20*b* and the fourth load device 20*d*. The second power consumption suppression control is control for suppressing the power consumption of the second load device 20*b* and the power consumption of the fourth load device 20*d* by reducing the required electric power of the second load device 20*b* and the required electric power of the fourth load device 20*d*. Thereafter, the process proceeds to step S25.

In step S25, the control device 30 executes second power consumption increase control on the third load device 20*c*. The second power consumption increase control is control for increasing the power consumption of the third load device 20*c* by increasing the required electric power of the third load device 20*c*. Thereafter, the process proceeds to step S26.

In step S26, the control device 30 determines whether or not the difference between the voltage of the first power supply subsystem 12*a* and the voltage of the second power supply subsystem 12*b* is equal to or less than a second voltage threshold. In a case where it is determined that the difference between the voltage of the first power supply subsystem 12*a* and the voltage of the second power supply subsystem 12*b* is greater than the second voltage threshold (step S26: NO), the process returns to step S24.

In a case where it is determined in the above-described step S23 that the difference between the voltage of the first power supply subsystem 12*a* and the voltage of the second power supply subsystem 12*b* is less than the first voltage threshold (step S23: YES), or in a case where it is determined in the immediately preceding step S26 that the difference between the voltage of the first power supply subsystem 12a and the voltage of the second power supply subsystem 12b is equal to or less than the second voltage threshold (step S26: YES), the process proceeds to step S27.

In step S27, the control device 30 executes the second connection control on the second connection device 24b. As a result, the third power supply circuit 18c and the fourth power supply circuit 18d are connected via the second connection circuit 22b. Thereafter, the fail-safe control is ended.

In the above-described step S21, in a case where it is determined that electric power is being supplied from the first power generation device 14a to the first load device 20a (step S21: NO), the process proceeds to step S28.

In step S28, the control device 30 determines whether or not the supply of electric power from the second power generation device 14b to the second load device 20b has been stopped. In a case where it is determined that the supply of electric power from the second power generation device 14b to the second load device 20b has been stopped (step S28: YES), the process proceeds to step S29.

In step S29, the control device 30 controls the disconnection device 26b to disconnect the second power generation device 14b from the second power supply circuit 18b and the first connection circuit 22a. Thereafter, the process proceeds to step S30.

In step S30, the control device 30 determines whether or not the difference between the voltage of the first power supply subsystem 12a and the voltage of the second power supply subsystem 12b is less than the first voltage threshold. In a case where it is determined that the difference between the voltage of the first power supply subsystem 12a and the voltage of the second power supply subsystem 12b is equal to or greater than the first voltage threshold (step S30: NO), the process proceeds to step S31.

In step S31, the control device 30 executes first power consumption suppression control on the first load device 20a and the third load device 20c. The first power consumption suppression control is control for suppressing the power consumption of the first load device 20a and the power consumption of the third load device 20c by reducing the required electric power of the first load device 20a and the required electric power of the third load device 20c. Thereafter, the process proceeds to step S32.

In step S32, the control device 30 executes first power consumption increase control on the fourth load device 20d. The first power consumption increase control is control for increasing the power consumption of the fourth load device 20d by increasing the required electric power of the fourth load device 20d. Thereafter, the process proceeds to step S33.

In step S33, the control device 30 determines whether or not the difference between the voltage of the first power supply subsystem 12a and the voltage of the second power supply subsystem 12b is equal to or less than the second voltage threshold. In a case where it is determined that the difference between the voltage of the first power supply subsystem 12a and the voltage of the second power supply subsystem 12b is greater than the second voltage threshold (step S33: NO), the process returns to step S31.

In a case where it is determined in the above-described step S30 that the difference between the voltage of the first power supply subsystem 12a and the voltage of the second power supply subsystem 12b is less than the first voltage threshold (step S30: YES), or in a case where it is determined in the immediately preceding step S33 that the difference between the voltage of the first power supply subsystem 12a and the voltage of the second power supply subsystem 12b is equal to or less than the second voltage threshold (step S33: YES), the process proceeds to step S34.

In step S34, the control device 30 executes the second connection control on the second connection device 24b. As a result, the third power supply circuit 18c and the fourth power supply circuit 18d are connected via the second connection circuit 22b. Thereafter, the fail-safe control is ended.

In the above-described step S28, in a case where it is determined that electric power is being supplied from the second power generation device 14b to the second load device 20b (step S28: NO), the process proceeds to step S35.

In step S35, the control device 30 determines whether or not the supply of electric power from the first power generation device 14a to the third load device 20c has been stopped. In a case where it is determined that the supply of electric power from the first power generation device 14a to the third load device 20c has been stopped (step S35: YES), the process proceeds to step S36.

In step S36, the control device 30 controls the disconnection device 26c to disconnect the first power generation device 14a from the third power supply circuit 18c and the second connection circuit 22b. Thereafter, the process proceeds to step S37.

In step S37, the control device 30 determines whether or not the difference between the voltage of the first power supply subsystem 12a and the voltage of the second power supply subsystem 12b is less than the first voltage threshold. In a case where it is determined that the difference between the voltage of the first power supply subsystem 12a and the voltage of the second power supply subsystem 12b is equal to or greater than the first voltage threshold (step S37: NO), the process proceeds to step S38.

In step S38, the control device 30 executes the second power consumption suppression control on the second load device 20b and the fourth load device 20d. Thereafter, the process proceeds to step S39.

In step S39, the control device 30 executes the second power consumption increase control on the first load device 20a. Thereafter, the process proceeds to step S40.

In step S40, the control device 30 determines whether or not the difference between the voltage of the first power supply subsystem 12a and the voltage of the second power supply subsystem 12b is equal to or less than the second voltage threshold. In a case where it is determined that the difference between the voltage of the first power supply subsystem 12a and the voltage of the second power supply subsystem 12b is greater than the second voltage threshold (step S40: NO), the process returns to step S38.

In a case where it is determined in the above-described step S37 that the difference between the voltage of the first power supply subsystem 12a and the voltage of the second power supply subsystem 12b is less than the first voltage threshold (step S37: YES), or in a case where it is determined in the immediately preceding step S40 that the difference between the voltage of the first power supply subsystem 12a and the voltage of the second power supply subsystem 12b is equal to or less than the second voltage threshold (step S40: YES), the process proceeds to step S41.

In step S41, the control device 30 executes first connection control on the first connection device 24a. As a result, the first power supply circuit 18a and the second power supply circuit 18b are connected via the first connection circuit 22a. Thereafter, the fail-safe control is ended.

In the above-described step S35, in a case where it is determined that electric power is being supplied from the first power generation device 14a to the third load device 20c (step S35: NO), the process proceeds to step S42.

In step S42, the control device 30 determines whether or not the supply of electric power from the second power generation device 14b to the fourth load device 20d has been stopped. In a case where it is determined that the supply of electric power from the second power generation device 14b to the fourth load device 20d has been stopped (step S42: YES), the process proceeds to step S43. In a case where it is determined that electric power is being supplied from the second power generation device 14b to the fourth load device 20d (step S42: NO), the fail-safe control is ended.

In step S43, the control device 30 controls the disconnection device 26d to disconnect the second power generation device 14b from the fourth power supply circuit 18d and the second connection circuit 22b. Thereafter, the process proceeds to step S44.

In step S44, the control device 30 determines whether or not the difference between the voltage of the first power supply subsystem 12a and the voltage of the second power supply subsystem 12b is less than the first voltage threshold. In a case where it is determined that the difference between the voltage of the first power supply subsystem 12a and the voltage of the second power supply subsystem 12b is equal to or greater than the first voltage threshold (step S44: NO), the process proceeds to step S45.

In step S45, the control device 30 executes the first power consumption suppression control on the first load device 20a and the third load device 20c. Thereafter, the process proceeds to step S46.

In step S46, the control device 30 executes the first power consumption increase control on the second load device 20b. Thereafter, the process proceeds to step S47.

In step S47, the control device 30 determines whether or not the difference between the voltage of the first power supply subsystem 12a and the voltage of the second power supply subsystem 12b is equal to or less than the second voltage threshold. In a case where it is determined that the difference between the voltage of the first power supply subsystem 12a and the voltage of the second power supply subsystem 12b is greater than the second voltage threshold (step S47: NO), the process returns to step S45.

In a case where it is determined in the above-described step S44 that the difference between the voltage of the first power supply subsystem 12a and the voltage of the second power supply subsystem 12b is less than the first voltage threshold (step S44: YES), or in a case where it is determined in the immediately preceding step S47 that the difference between the voltage of the first power supply subsystem 12a and the voltage of the second power supply subsystem 12b is equal to or less than the second voltage threshold (step S47: YES), the process proceeds to step S48.

In step S48, the control device 30 executes the first connection control on the first connection device 24a. As a result, the first power supply circuit 18a and the second power supply circuit 18b are connected via the first connection circuit 22a. Thereafter, the fail-safe control is ended.

FIGS. 16A to 16C are graphs each showing a temporal change in the state of the power supply system 10 in periods before and after a time point at which the first power supply subsystem 12a and the second power supply subsystem 12b are connected. The graph of FIG. 16A shows a temporal change in the voltage of the first power supply subsystem 12a and a temporal change in the voltage of the second power supply subsystem 12b. The graph of FIG. 16B shows temporal changes in the required electric power of the first load device 20a, the required electric power of the second load device 20b, the required electric power of the third load device 20c, and the required electric power of the fourth load device 20d. The graph of FIG. 16C shows a temporal change in the current flowing through the first connection circuit 22a and the second connection circuit 22b. In each of the graphs of FIGS. 16A to 16C, temporal changes in the voltage, electric power, and current are schematically shown.

At a time point t21, the supply of electric power to the first load device 20a is stopped, and at a time point t22, the second power consumption suppression control is executed on the second load device 20b and the fourth load device 20d, and the second power consumption increase control is executed on the third load device 20c.

In the period before the time point t21, the output electric power of the first power generation device 14a matches the sum of the required electric power of the first load device 20a and the required electric power of the third load device 20c, and the first power storage device 16a and the third power storage device 16c are not charged or discharged. Further, in the period before the time point t21, the output electric power of the second power generation device 14b matches the sum of the required electric power of the second load device 20b and the required electric power of the fourth load device 20d, and the second power storage device 16b and the fourth power storage device 16d are not charged or discharged.

At the time point t21, the output of the first load device 20a becomes 0 (zero), and therefore, the output of the second load device 20b, the output of the third load device 20c, and the output of the fourth load device 20d increase in order to maintain the overall output. Therefore, at the time point t21, the required electric power of the second load device 20b, the required electric power of the third load device 20c, and the required electric power of the fourth load device 20d increase.

At the time point t21, the required electric power of the third load device 20c increases, but the required electric power of the first load device 20a is 0 (zero), and the sum of the required electric power of the first load device 20a and the required electric power of the third load device 20c is smaller than the output electric power of the first power generation device 14a. Therefore, the first power generation device 14a is controlled to reduce its output electric power. However, since the response speed of the output electric power of the first power generation device 14a is relatively slow, the output electric power of the first power generation device 14a is surplus with respect to the required electric power of the third load device 20c for a while after the required electric power of the first load device 20a becomes 0 (zero).

At the time point t21, charging of the third power storage device 16c with the surplus electric power is started. Since electric power is input to the third power storage device 16c, an input current is generated in the third power storage device 16c, and a voltage rise due to the internal resistance occurs in the third power storage device 16c. Therefore, the output voltage of the third power storage device 16c increases. That is, the voltage of the first power supply subsystem 12a increases (a portion indicated by a reference sign R in FIG. 16A).

Further, in the period from the time point t21 to the time point t22, the charging of the third power storage device 16c is continued, and therefore, the SOC of the third power storage device 16c gradually increases, and the output voltage of the third power storage device 16c gradually increases. That is, the voltage of the first power supply subsystem 12a gradually increases (a portion indicated by a reference sign S in FIG. 16A).

In accordance with the increase in the required electric power of the second load device 20b and the required electric power of the fourth load device 20d at the time point t21, the second power generation device 14b is controlled to increase its output electric power. However, since the response speed of the output electric power of the second power generation device 14b is relatively slow, the output electric power of the second power generation device 14b is insufficient for the required electric power of the second load device 20b and the required electric power of the fourth load device 20d for a while after the required electric power of the second load device 20b and the required electric power of the fourth load device 20d are increased.

The electric power corresponding to the shortage is supplied from the second power storage device 16b to the second load device 20b, and is supplied from the fourth power storage device 16d to the fourth load device 20d. That is, at the time point t21, the second power storage device 16b and the fourth power storage device 16d start discharging. The start of the discharge of the second power storage device 16b increases the output electric power of the second power storage device 16b, and increases the output current of the second power storage device 16b. Therefore, the amount of voltage drop due to the internal resistance increases in the second power storage device 16b, and the output voltage of the second power storage device 16b decreases. In addition, the start of the discharge of the fourth power storage device 16d increases the output electric power of the fourth power storage device 16d, and increases the output current of the fourth power storage device 16d. Therefore, the amount of voltage drop due to the internal resistance increases in the fourth power storage device 16d, and the output voltage of the fourth power storage device 16d decreases. That is, the voltage of the second power supply subsystem 12b decreases (a portion indicated by a reference sign T in FIG. 16A).

Further, in the period from the time point t21 to the time point t22, the second power storage device 16b and the fourth power storage device 16d are discharged, and therefore, the SOC of the second power storage device 16b and the SOC of the fourth power storage device 16d gradually decrease. As the SOCs decrease, the open-end voltage of the second power storage device 16b and the open-end voltage of the fourth power storage device 16d decrease, and the output voltage of the second power storage device 16b and the output voltage of the fourth power storage device 16d gradually decrease. That is, the voltage of the second power supply subsystem 12b gradually decreases (a portion indicated by a reference sign U in FIG. 16A).

Since the voltage of the first power supply subsystem 12a increases and the voltage of the second power supply subsystem 12b decreases, the difference between the voltage of the first power supply subsystem 12a and the voltage of the second power supply subsystem 12b increases.

In the power supply system 10 of the second embodiment, at the time point t22, the second power consumption suppression control is executed on the second load device 20b and the fourth load device 20d. The required electric power of the second load device 20b and the required electric power of the fourth load device 20d are gradually reduced by the second power consumption suppression control. As a result, the output electric power of the second power storage device 16b and the output electric power of the fourth power storage device 16d gradually decrease, and the output current of the second power storage device 16b and the output current of the fourth power storage device 16d gradually decrease. Therefore, the amount of voltage drop due to the internal resistance gradually decreases in the second power storage device 16b and the fourth power storage device 16d. As a result, the output voltage of the second power storage device 16b and the output voltage of the fourth power storage device 16d gradually increase. Further, compared to the period from the time point t21 to the time point t22, the required electric power of the second load device 20b and the required electric power of the fourth load device 20d are reduced in the period from the time point t22 to a time point t23, and therefore, the decrease in the SOC of the second power storage device 16b and the decrease in the SOC of the fourth power storage device 16d are suppressed.

As described above, the second power consumption suppression control reduces the amount of voltage drop due to the internal resistance in the second power storage device 16b and the fourth power storage device 16d, and also suppresses the decrease in the SOC of the second power storage device 16b and the decrease in the SOC of the fourth power storage device 16d to thereby suppress the decrease in the output voltage of the second power storage device 16b and the decrease in the output voltage of the fourth power storage device 16d. Therefore, the decrease in the voltage of the second power supply subsystem 12b is suppressed.

Further, in the power supply system 10 of the second embodiment, the second power consumption increase control is executed on the third load device 20c at the time point t22. The required electric power of the third load device 20c is gradually increased by the second power consumption increase control. When the required electric power of the third load device 20c becomes larger than the output electric power of the first power generation device 14a, the electric power corresponding to the shortage is supplied from the third power storage device 16c to the third load device 20c. As the required electric power of the third load device 20c gradually increases, the output electric power of the third power storage device 16c gradually increases, and the output current of the third power storage device 16c gradually increases. Therefore, the amount of voltage drop due to the internal resistance gradually increases in the third power storage device 16c.

Further, in the period from time point t22 to the time point t23, the third power storage device 16c is discharged, and therefore, the decrease in the SOC of the third power storage device 16c is promoted.

As described above, the second power consumption increase control increases the amount of voltage drop due to the internal resistance in the third power storage device 16c, and also promotes the decrease in the SOC of the third power storage device 16c to thereby promote the decrease in the output voltage of the third power storage device 16c. That is, the decrease in the voltage of the first power supply subsystem 12a is promoted.

By promoting the decrease in the voltage of the first power supply subsystem 12a and suppressing the decrease in the voltage of the second power supply subsystem 12b, the voltage of the first power supply subsystem 12a can be approximated to the voltage of the second power supply subsystem 12b. At the time point t23 at which the voltage of the first power supply subsystem 12a and the voltage of the second power supply subsystem 12b are approximate to each other, the third power supply circuit 18c and the fourth power supply circuit 18d are connected, and therefore, it is possible to prevent an overcurrent from flowing in the power supply system 10. Therefore, damage to each apparatus and each device of the power supply system 10 is suppressed. Further, it is not necessary to design each apparatus and each device of the power supply system 10 to withstand an overcurrent, and therefore, it is possible to suppress the manufacturing cost of the power supply system 10.

Third Embodiment

[Configuration of Moving Object]

FIG. 17 is a schematic view of a moving object 44. The power supply system 10 is mounted on the moving object 44.

The moving object 44 of the present embodiment is an electric vertical take-off and landing aircraft (eVTOL aircraft). The moving object 44 includes eight VTOL rotors 46. The VTOL rotors 46 generate upward thrust for a fuselage 48. The moving object 44 includes eight electric motors 50. One electric motor 50 drives one VTOL rotor 46. The moving object 44 includes two cruise rotors 52. The cruise rotors 52 generate forward thrust for the fuselage 48. The moving object 44 includes four electric motors 54. Two electric motors 54 drive one cruise rotor 52.

Each of the first load device 20a, the second load device 20b, the third load device 20c, and the fourth load device 20d may include two electric motors 50 and one electric motor 54. Each of the first load device 20a, the second load device 20b, the third load device 20c, and the fourth load device 20d may include a low-voltage drive device in addition to the electric motors 50 and the electric motor 54.

The moving object 44 is not limited to an aircraft, and may be a ship, an automobile, a train, or the like.

The following supplementary notes are further disclosed in relation to the above-described embodiments.

Supplementary Note 1

The power supply system (10) of the present disclosure includes: the first power supply circuit (18a) configured to supply, to the first load device (20a), electric power output from the first power generation device (14a), the electric power being DC power; the first power storage device (16a) connected to the first power supply circuit in parallel with the first power generation device; the second power supply circuit (18b) configured to supply, to the second load device (20b), electric power output from the second power generation device (14b), the electric power being DC power; the second power storage device (16b) connected to the second power supply circuit in parallel with the second power generation device; the first connection circuit (22a) including the first connection device (24a) configured to connect the first power supply circuit and the second power supply circuit to each other; and the control device (30) configured to execute, on the first connection device, first connection control for connecting the first power supply circuit and the second power supply circuit to each other via the first connection circuit, wherein, in a case where the electric power output from the second power generation device is required to be supplied to the first load device and a difference between the voltage of the first power supply circuit and the voltage of the second power supply circuit is equal to or greater than the first voltage threshold determined in advance, the control device executes the first connection control on the first connection device after executing first power consumption suppression control on the first load device and executing first power consumption increase control on the second load device, the first power consumption suppression control being control for suppressing the power consumption of the first load device to suppress a decrease in the output voltage of the first power storage device, the first power consumption increase control being control for increasing the power consumption of the second load device to promote a decrease in the output voltage of the second power storage device. According to this feature, it is possible to prevent an overcurrent from flowing in the power supply system.

Supplementary Note 2

In the power supply system according to Supplementary Note 1, in the case where the electric power output from the second power generation device is required to be supplied to the first load device and the difference between the voltage of the first power supply circuit and the voltage of the second power supply circuit is equal to or greater than the first voltage threshold, the control device may execute the first connection control on the first connection device after executing the first power consumption suppression control on the first load device and executing the first power consumption increase control on the second load device until the difference between the voltage of the first power supply circuit and the voltage of the second power supply circuit becomes equal to or less than the second voltage threshold determined in advance. According to this feature, it is possible to prevent an overcurrent from flowing in the power supply system.

Supplementary Note 3

The power supply system according to Supplementary Note 1 may further include the disconnection device (26a) configured to disconnect the first power generation device from the first power supply circuit and the first connection circuit, wherein in a case where supply of the electric power from the first power generation device to the first power supply circuit is cut off, the control device may execute the first connection control on the first connection device after disconnecting the first power generation device from the first power supply circuit and the first connection circuit using the disconnection device. According to this feature, it is possible to prevent an overcurrent from flowing in the power supply system.

Supplementary Note 4

The power supply system according to Supplementary Note 1 may further include: the third power supply circuit (18c) configured to supply, to the third load device (20c), the electric power output from the first power generation device; the third power storage device (16c) connected to the third power supply circuit in parallel with the first power generation device; the fourth power supply circuit (18d) configured to supply, to the fourth load device (20d), the electric power output from the second power generation device; the fourth power storage device (16d) connected to the fourth power supply circuit in parallel with the second power generation device; the second connection circuit (22b) including the second connection device (24b) configured to connect the third power supply circuit and the fourth power supply circuit to each other; and the disconnection device configured to disconnect the first power generation device from the first power supply circuit and the first connection circuit, wherein the control device is configured to execute, on the second connection device, second connection control for connecting the third power supply circuit and the fourth power supply circuit to each other via the second connection circuit, and wherein, in a case where supply of the electric power from the first power generation device to the first load device is stopped, the control device may: disconnect the first power generation device from the first power supply circuit and the first connection circuit using the disconnection device; and execute the second connection control on the second connection device after executing second power consumption suppression control on the second load device and the fourth load device and executing second power consumption increase control on the third load device, the second power consumption suppression control being control for suppressing the power consumption of the second load device and the power consumption of the fourth load device to suppress the decrease in the output voltage of the second power storage device and a decrease in the output voltage of the fourth power storage device, the second power consumption increase control being control for increasing the power consumption of the third load device to promote a decrease in the output voltage of the third power storage device. According to this feature, it is possible to prevent an overcurrent from flowing in the power supply system.

Supplementary Note 5

The moving object (44) of the present disclosure includes the power supply system according to any one of Supplementary Notes 1 to 4. According to this feature, it is possible to prevent an overcurrent from flowing in the power supply system.

Supplementary Note 6

The control method of the power supply system of the present disclosure is a control method of a power supply system including: the first power supply circuit configured to supply, to the first load device, electric power output from the first power generation device, the electric power being DC power; the first power storage device connected to the first power supply circuit in parallel with the first power generation device; the second power supply circuit configured to supply, to the second load device, electric power output from the second power generation device, the electric power being DC power; the second power storage device connected to the second power supply circuit in parallel with the second power generation device; and the first connection circuit including the first connection device configured to connect the first power supply circuit and the second power supply circuit to each other, the control method comprising, in a case where the electric power output from the second power generation device is required to be supplied to the first load device and a difference between the voltage of the first power supply circuit and the voltage of the second power supply circuit is equal to or greater than the first voltage threshold determined in advance, executing, on the first connection device, first connection control for connecting the first power supply circuit and the second power supply circuit to each other via the first connection circuit, after executing first power consumption suppression control on the first load device and executing first power consumption increase control on the second load device, the first power consumption suppression control being control for suppressing the power consumption of the first load device to suppress a decrease in the output voltage of the first power storage device, the first power consumption increase control being control for increasing the power consumption of the second load device to promote a decrease in the output voltage of the second power storage device. According to this feature, it is possible to prevent an overcurrent from flowing in the power supply system.

Although the present disclosure has been described in detail, the present disclosure is not limited to the above-described individual embodiments. Various additions, replacements, modifications, partial deletions, and the like can be made to these embodiments without departing from the gist of the present disclosure, or without departing from the essence of the present disclosure derived from the claims and equivalents thereof. Further, these embodiments can also be implemented in combination. For example, in the above-described embodiments, the order of operations and the order of processes are shown as examples, and are not limited to these. Furthermore, the same applies to a case where numerical values or mathematical expressions are used in the description of the above-described embodiments.

The invention claimed is:

1. A power supply system comprising:
a first power supply circuit configured to supply, to a first load device, electric power output from a first power generation device, the electric power being direct current electric power;
a first power storage device connected to the first power supply circuit in parallel with the first power generation device;
a second power supply circuit configured to supply, to a second load device, electric power output from a second power generation device, the electric power being direct current electric power;
a second power storage device connected to the second power supply circuit in parallel with the second power generation device;
a first connection circuit including a first connection device configured to connect the first power supply circuit and the second power supply circuit to each other; and
a control device including one or more processors that execute computer-executable instructions stored in a memory, wherein the one or more processors execute the computer-executable instructions to cause the control device to execute, on the first connection device, first connection control for connecting the first power supply circuit and the second power supply circuit to each other via the first connection circuit,
wherein, in a case where the electric power output from the second power generation device is required to be supplied to the first load device and a difference between a voltage of the first power supply circuit and a voltage of the second power supply circuit is equal to or greater than a first voltage threshold determined in advance, the one or more processors cause the control device to execute the first connection control on the first connection device after executing first power consumption suppression control on the first load device and executing first power consumption increase control on the second load device, the first power consumption suppression control being control for suppressing power consumption of the first load device to suppress a decrease in an output voltage of the first power storage device, the first power consumption increase control being control for increasing power consumption of the second load device to promote a decrease in an output voltage of the second power storage device.

2. The power supply system according to claim 1, wherein in the case where the electric power output from the second power generation device is required to be supplied to the first load device and the difference between the voltage of the first power supply circuit and the voltage of the second power supply circuit is equal to or greater than the first voltage threshold, the one or more processors cause the control device to execute the first connection control on the first connection device after executing the first power consumption suppression control on the first load device and executing the first power consumption increase control on the second load device until the difference between the voltage of the first power supply circuit and the voltage of the second power supply circuit becomes equal to or less than a second voltage threshold determined in advance.

3. The power supply system according to claim 1, further comprising a disconnection device configured to disconnect the first power generation device from the first power supply circuit and the first connection circuit, wherein in a case where supply of the electric power from the first power generation device to the first power supply circuit is cut off, the one or more processors cause the control device to execute the first connection control on the first connection device after disconnecting the first power generation device from the first power supply circuit and the first connection circuit using the disconnection device.

4. The power supply system according to claim 1, further comprising:

a third power supply circuit configured to supply, to a third load device, the electric power output from the first power generation device;

a third power storage device connected to the third power supply circuit in parallel with the first power generation device;

a fourth power supply circuit configured to supply, to a fourth load device, the electric power output from the second power generation device;

a fourth power storage device connected to the fourth power supply circuit in parallel with the second power generation device;

a second connection circuit including a second connection device configured to connect the third power supply circuit and the fourth power supply circuit to each other; and a disconnection device configured to disconnect the first power generation device from the first power supply circuit and the first connection circuit, wherein the one or more processors cause the control device to execute, on the second connection device, second connection control for connecting the third power supply circuit and the fourth power supply circuit to each other via the second connection circuit, and wherein, in a case where supply of the electric power from the first power generation device to the first load device is stopped, the one or more processors cause the control device to:

disconnect the first power generation device from the first power supply circuit and the first connection circuit using the disconnection device; and execute the second connection control on the second connection device after executing second power consumption suppression control on the second load device and the fourth load device and executing second power consumption increase control on the third load device, the second power consumption suppression control being control for suppressing the power consumption of the second load device and power consumption of the fourth load device to suppress the decrease in the output voltage of the second power storage device and a decrease in an output voltage of the fourth power storage device, the second power consumption increase control being control for increasing power consumption of the third load device to promote a decrease in an output voltage of the third power storage device.

5. A moving object comprising the power supply system according to claim 1.

6. A control method of a power supply system, the power supply system including:

a first power supply circuit configured to supply, to a first load device, electric power output from a first power generation device, the electric power being direct current electric power;

a first power storage device connected to the first power supply circuit in parallel with the first power generation device;

a second power supply circuit configured to supply, to a second load device, electric power output from a second power generation device, the electric power being direct current electric power;

a second power storage device connected to the second power supply circuit in parallel with the second power generation device; and a first connection circuit including a first connection device configured to connect the first power supply circuit and the second power supply circuit to each other, the control method comprising, in a case where the electric power output from the second power generation device is required to be supplied to the first load device and a difference between a voltage of the first power supply circuit and a voltage of the second power supply circuit is equal to or greater than a first voltage threshold determined in advance, executing, on the first connection device, first connection control for connecting the first power supply circuit and the second power supply circuit to each other via the first connection circuit, after executing first power consumption suppression control on the first load device and executing first power consumption increase control on the second load device, the first power consumption suppression control being control for suppressing power consumption of the first load device to suppress a decrease in an output voltage of the first power storage device, the first power consumption increase control being control for increasing power consumption of the second load device to promote a decrease in an output voltage of the second power storage device.

* * * * *